(12) United States Patent
Chou et al.

(10) Patent No.: US 11,762,132 B2
(45) Date of Patent: Sep. 19, 2023

(54) IMAGING LENS ASSEMBLY MODULE AND ELECTRONIC DEVICE

(71) Applicant: LARGAN PRECISION CO., LTD., Taichung (TW)

(72) Inventors: Ming-Ta Chou, Taichung (TW); Cheng-Feng Lin, Taichung (TW); Po-Lun Hsu, Taichung (TW); Ming-Shun Chang, Taichung (TW); Ming-Ching Lin, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 372 days.

(21) Appl. No.: 16/932,928

(22) Filed: Jul. 20, 2020

(65) Prior Publication Data
US 2021/0088698 A1   Mar. 25, 2021

(30) Foreign Application Priority Data
Sep. 25, 2019   (TW) .................................. 108134706

(51) Int. Cl.
*G02B 7/02*   (2021.01)
*G02B 5/00*   (2006.01)
*G02B 13/00*   (2006.01)

(52) U.S. Cl.
CPC .............. *G02B 5/003* (2013.01); *G02B 7/021* (2013.01); *G02B 13/0045* (2013.01)

(58) Field of Classification Search
CPC .... G02B 5/003; G02B 7/021; G02B 13/0045; G02B 5/005; G02B 7/022; G02B 13/0015; G02B 1/041; G02B 7/02; G02B 13/0055; G02B 5/00; G02B 9/64
See application file for complete search history.

(56) References Cited

U.S. PATENT DOCUMENTS

| 7,391,457 B2 | 6/2008 | Fujimoto et al. |
| 8,031,412 B2 | 10/2011 | Shintani |
| 8,102,609 B2 | 1/2012 | Tsuchiya et al. |
| 8,736,989 B2 | 5/2014 | Wu |
| 9,341,813 B1 | 5/2016 | Lin et al. |

(Continued)

FOREIGN PATENT DOCUMENTS

| CN | 103676062 A | 3/2014 |
| CN | 205333947 U | 6/2016 |

(Continued)

*Primary Examiner* — Balram T Parbadia
(74) *Attorney, Agent, or Firm* — McClure, Qualey & Rodack, LLP

(57) ABSTRACT

An imaging lens assembly module has an optical axis, and includes at least one plastic lens element, a carrier element and a light absorbing layer. The plastic lens element, in order from a center to a peripheral region thereof, includes an optical effective portion and a peripheral portion. A side of the peripheral portion includes a plurality of step structures interposed between the side of the peripheral portion and a same side of the optical effective portion. The carrier element defines an inner space for disposing the plastic lens element, and includes a tip end minimal opening and a plurality of annular inner walls. The light absorbing layer is disposed on the peripheral portion of the plastic lens element, and the step structures and the at least one of the annular inner walls facing towards the plastic lens element.

17 Claims, 22 Drawing Sheets

(56) References Cited

U.S. PATENT DOCUMENTS

| | | | |
|---|---|---|---|
| 9,513,454 B2 | 12/2016 | Lin et al. | |
| 9,638,838 B1* | 5/2017 | Fan | G02B 27/0018 |
| 9,952,359 B2 | 4/2018 | Chang | |
| 10,234,658 B2 | 3/2019 | Lin et al. | |
| 10,288,778 B2 | 5/2019 | Hsu et al. | |
| 10,564,383 B2 | 2/2020 | Chou | |
| 10,578,839 B2 | 3/2020 | Lin et al. | |
| 2014/0347738 A1* | 11/2014 | Tsai | G02B 27/0018 |
| | | | 359/642 |
| 2015/0062727 A1* | 3/2015 | Kang | G02B 7/023 |
| | | | 359/793 |
| 2015/0103407 A1 | 4/2015 | Chen | |
| 2016/0349476 A1* | 12/2016 | Lin | G02B 7/026 |
| 2017/0010434 A1* | 1/2017 | Chou | G02B 7/021 |
| 2017/0176649 A1* | 6/2017 | Chang | G02B 9/34 |
| 2017/0322395 A1* | 11/2017 | Lin | G02B 5/003 |
| 2018/0292626 A1* | 10/2018 | Chou | G02B 13/003 |
| 2019/0064399 A1 | 2/2019 | Wang et al. | |
| 2019/0179098 A1* | 6/2019 | Yang | G02B 7/022 |

FOREIGN PATENT DOCUMENTS

| | | |
|---|---|---|
| CN | 205485018 U | 8/2016 |
| CN | 107357024 A | 11/2017 |
| CN | 206757143 U | 12/2017 |
| TW | I591376 B | 7/2017 |
| TW | 201736893 A | 10/2017 |
| TW | 201837500 A | 10/2018 |

\* cited by examiner

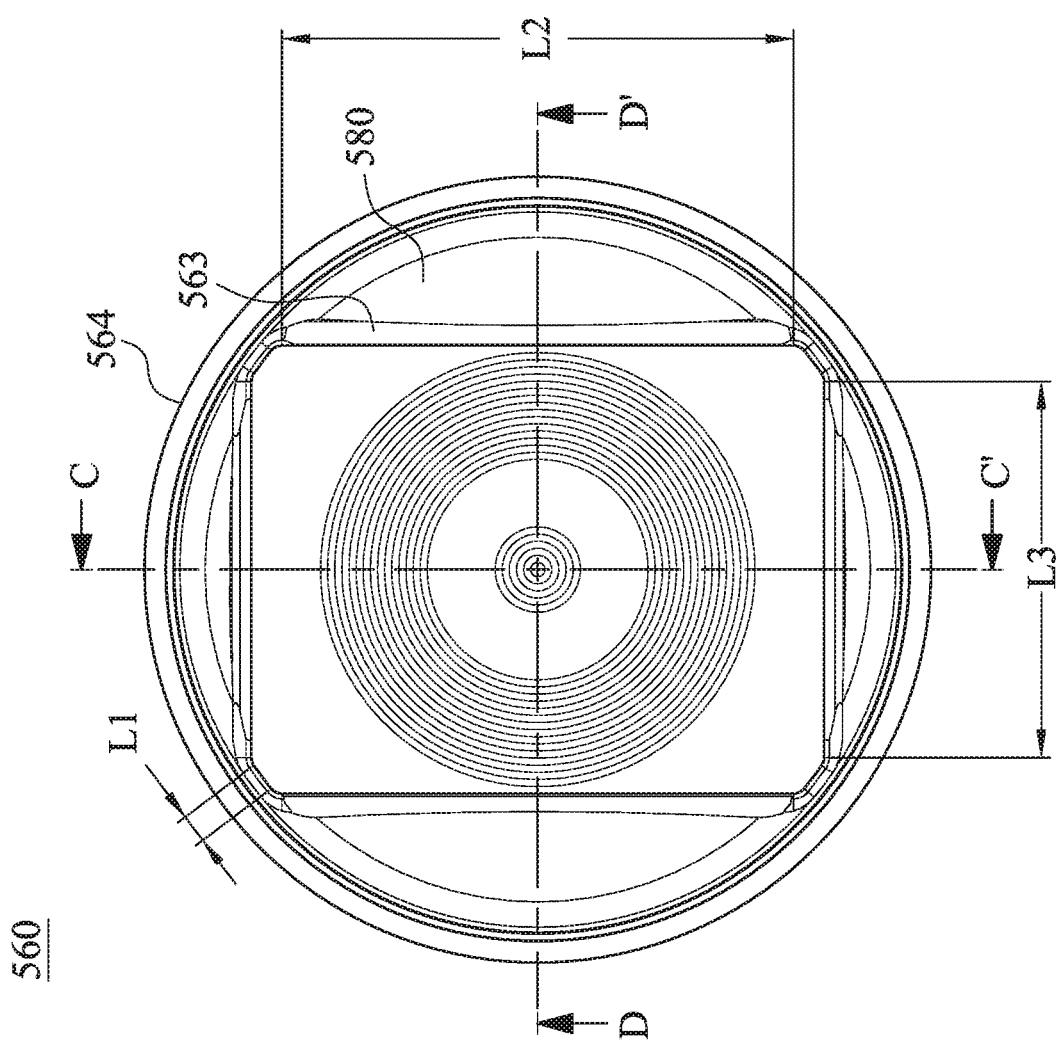

IMAGING LENS ASSEMBLY MODULE AND ELECTRONIC DEVICE

RELATED APPLICATIONS

This application claims priority to Taiwan Application Serial Number 108134706, filed Sep. 25, 2019, which is herein incorporated by reference.

BACKGROUND

Technical Field

The present disclosure relates to an imaging lens assembly module. More particularly, the present disclosure relates to an imaging lens assembly module applicable to a portable electronic device.

Description of Related Art

In recent years, portable electronic devices have developed rapidly. For example, intelligent electronic devices and tablets have been filled in the lives of modern people, and imaging lens assembly modules thereof mounted on portable electronic devices have also prospered. However, as technology advances, the quality requirements of imaging lens assembly modules are becoming higher and higher. Therefore, an imaging lens assembly module with a light blocking cover with an ability of effectively capturing the non-imaging light needs to be developed.

SUMMARY

According to one aspect of the present disclosure, an imaging lens assembly module has an optical axis, and includes at least one plastic lens element, a carrier element and a light absorbing layer. The plastic lens element, in order from a center to a peripheral region thereof, includes an optical effective portion and a peripheral portion. The optical axis passes through the optical effective portion. The peripheral portion surrounds the optical effective portion, and a side of at least one of an object side and an image side of the peripheral portion includes a plurality of step structures. The step structures are interposed between the side of the at least one of the object side and the image side of the peripheral portion and a same side of the optical effective portion. The carrier element defines an inner space for disposing the plastic lens element, and includes a tip end minimal opening and a plurality of annular inner walls. The optical axis passes through the tip end minimal opening. Diameters of the annular inner walls vertical to the optical axis are different, wherein at least one of the annular inner walls faces towards the plastic lens element. The light absorbing layer is disposed on the peripheral portion of the plastic lens element, and the step structures and the at least one of the annular inner walls facing towards the plastic lens element. A portion of the light absorbing layer is disposed on the at least one of the annular inner walls facing towards the plastic lens element to form an annular concave arc. The light absorbing layer is for retaining the plastic lens element in the inner space of the carrier element.

According to one aspect of the present disclosure, an electronic device includes the imaging lens assembly module of the aforementioned aspect and an image sensor. The image sensor is posed on an image surface of the imaging lens assembly module.

According to another aspect of the present disclosure, an imaging lens assembly module has an optical axis, and includes at least one plastic lens element, a carrier element and a light absorbing layer. The plastic lens element, in order from a center to a peripheral region thereof, includes an optical effective portion and a peripheral portion. The optical axis passes through the optical effective portion. The peripheral portion surrounds the optical effective portion. The carrier element defines an inner space for disposing the plastic lens element, and includes a tip end minimal opening and a plurality of annular inner walls. The optical axis passes through the tip end minimal opening. Diameters of the annular inner walls vertical to the optical axis are different, wherein at least one of the annular inner walls faces towards the plastic lens element. The light absorbing layer is disposed on the peripheral portion of the plastic lens element and the at least one of the annular inner walls facing towards the plastic lens element. A portion of the light absorbing layer is disposed on the at least one of the annular inner walls facing towards the plastic lens element to form an annular concave arc. The light absorbing layer is for retaining the plastic lens element in the inner space of the carrier element. The tip end minimal opening is disposed on an object side of the plastic lens element, and the light absorbing layer is disposed on an image side of the plastic lens element to surround the optical effective portion of the image side of the plastic lens element. A shape of the tip end minimal opening is different from an opening shape of the light absorbing layer.

According to one aspect of the present disclosure, an electronic device includes the imaging lens assembly module of the aforementioned aspect and an image sensor. The image sensor is disposed on an image surface of the imaging lens assembly module. A photosensitive area of the image sensor is a rectangle, the opening shape of the light absorbing layer of the imaging lens assembly module is a polygon, and a long side of the rectangle is corresponding to a longest side of the polygon.

BRIEF DESCRIPTION OF THE DRAWINGS

The present disclosure can be more fully understood by reading the following detailed description of the example, with reference made to the accompanying drawings as follows:

FIG. 5D is a top view of an image-side surface of the plastic lens element according to the 5th example in FIG. 5A.

DETAILED DESCRIPTION

Figure 1A:
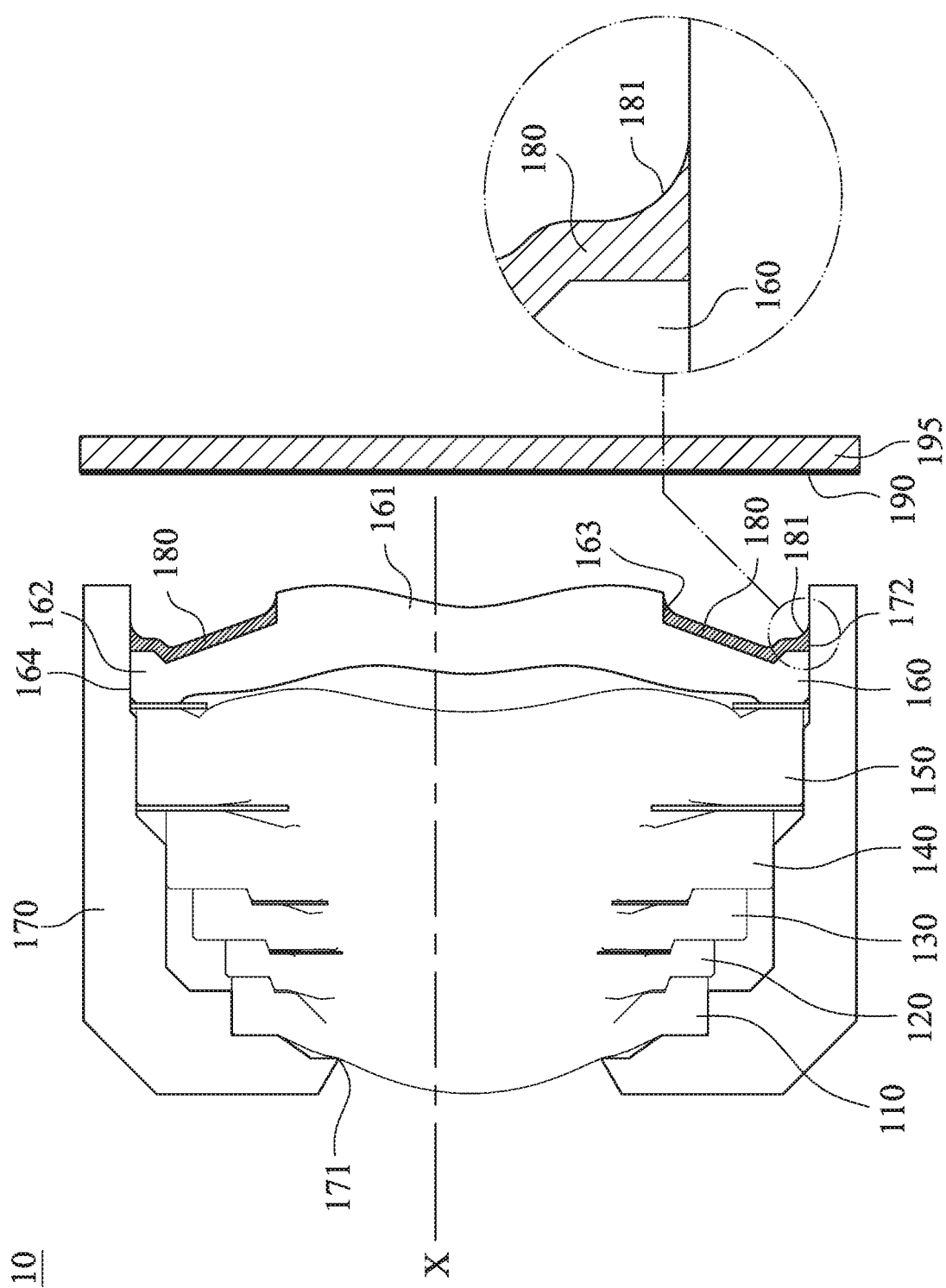
FIG. 1A is a schematic view of an electronic device according to the 1st example of the present disclosure.

The present disclosure provides an imaging lens assembly module. The imaging lens assembly module has an optical axis, and includes at least one plastic lens element, a carrier element and a light absorbing layer. The plastic lens element, in order from a center to a peripheral region thereof, includes an optical effective portion and a peripheral portion, wherein the optical axis passes through the optical effective portion, and the peripheral portion surrounds the optical effective portion. An inner space is defined via the carrier element for disposing the plastic lens element, and the carrier element includes a tip end minimal opening and a plurality of annular inner walls, wherein the optical axis passes through the tip end minimal opening. Furthermore, the carrier element can be a plastic lens barrel or a single element which is the plastic lens barrel integrally formed with a carrier via an injection molding. Diameters of the annular inner walls vertical to the optical axis are different, wherein at least one of the annular inner walls faces towards the plastic lens element. That is, the annular inner walls are overlapped the plastic lens element at a direction vertical to the optical axis. The light absorbing layer is disposed on the peripheral portion of the plastic lens element and the annular inner walls facing towards the plastic lens element. A portion of the light absorbing layer is disposed on the annular inner walls facing towards the plastic lens element to form an annular concave arc. The light absorbing layer is for retaining the plastic lens element in the inner space of the carrier element. Therefore, the liquid light absorbing layer solidifies to form a light blocking cover with high blocking efficiency, and the light absorbing layer after solidifying has the reliability of remaining lens elements and the plastic lens element. Hence, the light absorbing layer can simultaneously be used as a retainer to proceed an assembling operation of the imaging lens assembly module, a volume of the light absorbing layer is smaller than a volume of a plastic retainer with a fixed shape, and the non-imaging light can be more effectively blocked via the light absorbing layer.

The tip end minimal opening is disposed on an object side of the plastic lens element, and the light absorbing layer is disposed on an image side of the plastic lens element to surround the optical effective portion of the image side of the plastic lens element. Therefore, it can be regarded that the light blocking cover is disposed on an area of the imaging lens assembly module near an image surface. That is, the non-imaging light excluding the necessary imaging light is captured via the light blocking cover as possible to avoid the further reflection of the non-imaging light. Hence, the better efficiency of capturing the non-imaging light can be achieved via a disposing location of the light absorbing layer and a relative location of an entrance pupil of the imaging lens assembly module.

A shape of the tip end minimal opening is different from an opening shape of the light absorbing layer. Therefore, the better efficiency of capturing the non-imaging light is achieved. Furthermore, the opening shape of the light absorbing layer can be a polygon, and it can be regarded as the engineering consideration that is used to improve the glare from the light absorbing layer.

A side of at least one of an object side and an image side of the peripheral portion includes a plurality of step structures, the step structures are interposed between the side of the at least one of the object side and the image side of the peripheral portion and a same side of the optical effective portion, and the light absorbing layer is disposed on the step structures. In detail, a distance between the optical effective portion and the peripheral portion of the adjacent lens elements is kept along a direction parallel to the optical axis via the step structures. Therefore, the plastic lens element is connected to the optical effective portion and the peripheral portion via the step structures, and the liquid light absorbing layer can sufficiently surround the optical effective portion. Meanwhile, the precision level of a polygonal opening of the light absorbing layer can be increased, and the accumulated light absorbing layer can be avoid forming the surface spheroidization. If the surface spheroidization is formed, the non-imaging light cannot be reduced.

The light absorbing layer on the step structures can have an uneven thickness. Therefore, an appearance of the accumulated light absorbing layer can be controlled, and it is favorable for increasing the efficiency of the light absorbing layer absorbing the visible light.

The step structures are for separating the optical effective portion and the peripheral portion, an outer contour is formed on the side of the optical effective portion, and the outer contour can be different from an outer contour formed on the other side of the optical effective portion. For example, the outer contour of the optical effective portion of an object side is circle, and the outer contour of the optical effective portion of an image side is polygonal because the step structures are interposed on the optical effective portion of the image side. Therefore, the light absorbing layer can be coated on an ideal position of the plastic lens element, and a blocking range of the light blocking cover can be increased. Moreover, a coating method of the present disclosure does not be limited by the coating method of prior art that must be along an annular track.

An object side of the plastic lens element can further include an object-side receiving surface for receiving a lens element adjacent the object side of the plastic lens element, and the object-side receiving surface is a circular ring shape. Therefore, a force on the plastic lens element can be even, the risk of decreasing the precision level of forming the optical effective portion can be decreased, and the circular symmetry, the precision level and the consistence of the optical effective portion of the object-side surface can be better via the circular ring shape.

The step structure can be an arc structure. Therefore, the step structures can be flexibly cooperated with a structure of the optical effective portion, and a geometric shape of a portion of the optical effective portion close the step structures can be avoid being excessively different to decrease the risk of molding failure.

The step structures can include a first arc structure and a second arc structure, the first arc structure is located on the peripheral portion, and the second arc structure is located on the outer contour of the optical effective portion. In detail, the first arc structure is flexibly cooperated with the second arc structure. Therefore, a surface of partial large of the step structures can be avoided, and a travelling path of the highly reflective non-imaging light can be further avoided.

Both of a center to a peripheral region of the first arc structure and a center to a peripheral region of the second arc structure can bend from an image side of the imaging lens assembly module to an object side of the imaging lens assembly module. In detail, both of the center to the peripheral region of the first arc structure and the center to the peripheral region of the second arc structure can bend from the image side of the imaging lens assembly module to the object side of the imaging lens assembly module according to the structure of the plastic lens element. Therefore, it is favorable for decreasing the possibility of partially and substantially accumulating the light intensity of surface reflection.

The step structures can have uneven heights. Therefore, it is favorable for fitting the shape of the optical effective portion to decrease the failure ratio of the injection molding of the plastic lens element.

When a height difference between each of the step structures parallel to a direction of the optical axis is h, the following condition can be satisfied: 0.015 mm<h<0.5 mm. Therefore, an excessively small step difference or an excessively large step difference can be avoided via the proper step difference height. The light absorbing layer easily and partially overflows because of the excessively small step difference, and an inner surface reflection that is unnecessary is easily caused inside of the plastic lens element because of the excessively large step difference. Furthermore, the following condition can be satisfied: 0.02 mm<h<0.4 mm. Therefore, it is favorable for decreasing the failure ratio during the manufacturing process to promote the manufacturing efficiency via more specific height difference and smaller height difference.

The polygonal opening shape of the light absorbing layer can include a plurality of lengths, and at least two of the lengths can be different. Therefore, the light-blocking absorbing layer of a larger blocking range can be manufactured. Furthermore, at least three of the lengths of the polygon can be different. Hence, a number of the lengths can be ideally controlled, and the possibility of mass production can be increased.

When a number of sides of the polygonal opening of the light absorbing layer is N, the following condition can be satisfied: 3<N<33. Therefore, a proper N value is favorable for maintaining the ideal balance between the demand of imaging specification and the improvement of the stray light. Furthermore, the following condition can be satisfied: 3<N<9. Therefore, the cutting design of the light blocking cover proper for image format is favorable for maximizing the blocking range of the light blocking range. Furthermore, the following condition can be satisfied: 11<N<26. Therefore, the unnecessary flare at a peripheral area of a light source during imaging can be improved.

Each of the aforementioned features of the imaging lens assembly module can be utilized in various combinations for achieving the corresponding effects.

The present disclosure provides an electronic device, which includes the aforementioned imaging lens assembly module and an image sensor, wherein the image sensor is disposed on an image surface of the imaging lens assembly module. A photosensitive area of the image sensor is a rectangle, the opening shape of the light absorbing layer of the imaging lens assembly module is a polygon, and a long side of the rectangle is corresponding to a longest side of the polygon. Therefore, the non-imaging light near the image sensor can be further captured to decrease the possibility of the non-imaging light wandering and diffusing.

According to the aforementioned embodiment, specific examples are provided, and illustrated via figures.

1st Example

Figure 1B:
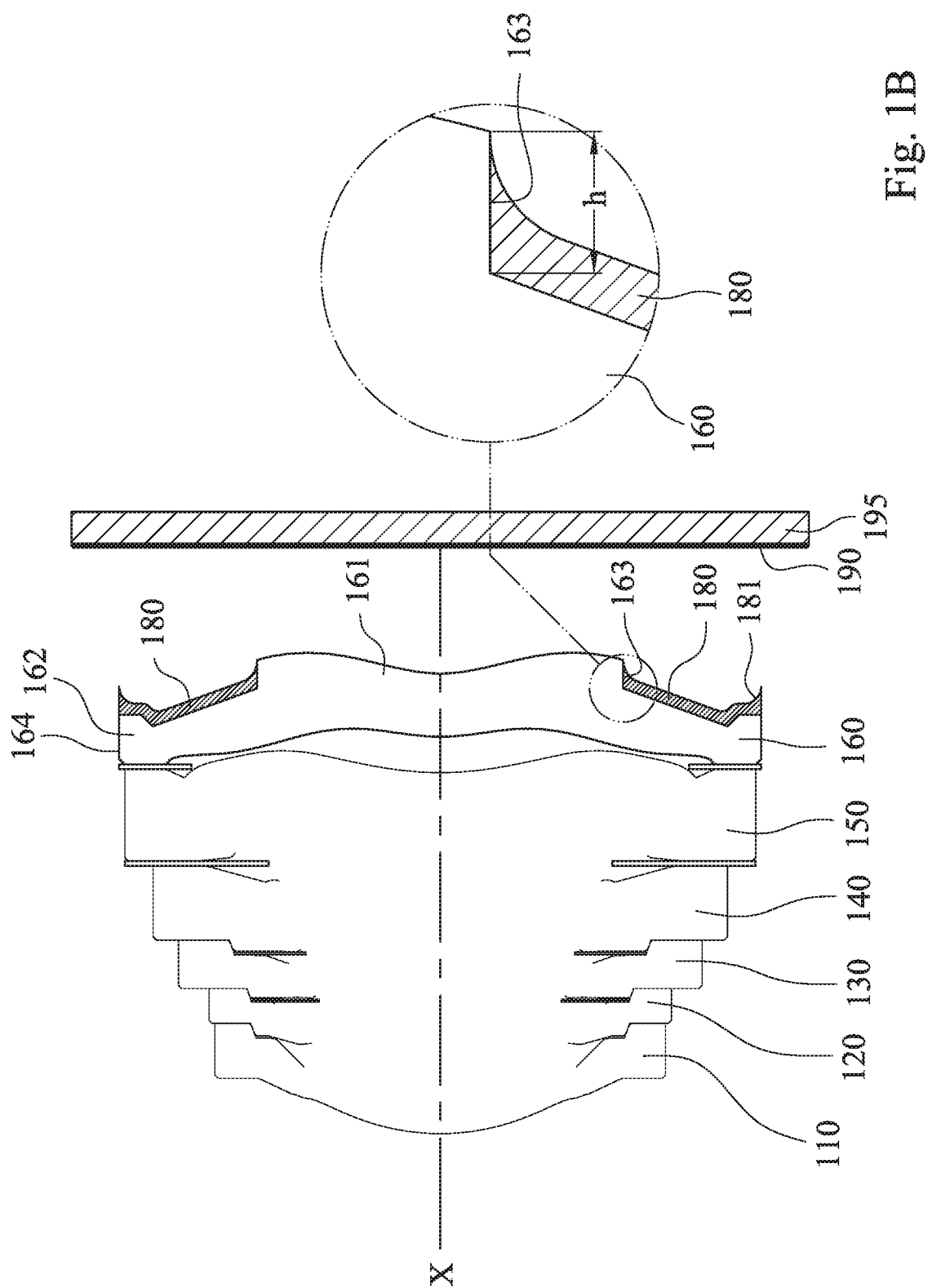
FIG. 1B is a partial schematic view of the electronic device according to the 1st example in FIG. 1A.

FIG. 1A is a schematic view of an electronic device 10 according to the 1st example of the present disclosure. FIG. 1B is a partial schematic view of the electronic device 10 according to the 1st example in FIG. 1A. In FIG. 1A, the electronic device 10 (in detail, a camera unit of the electronic device 10) includes an imaging lens assembly module (its reference numeral is omitted) and an image sensor 195. The imaging lens assembly module has an optical axis X, and includes a plurality of lens elements, at least one plastic lens element 160, a carrier element 170, a light absorbing layer 180 and an image surface 190, wherein the carrier element 170 defines an inner space for disposing the lens elements and the plastic lens element 160, and the image surface 190 is located on an image side of the carrier element 170. The image sensor 195 is disposed on the image surface 190 of the imaging lens assembly module.

In detail, according to the 1st example, the imaging lens assembly module, in order from an object side to an image side, includes a first lens element 110, a second lens element 120, a third lens element 130, a fourth lens element 140, a fifth lens element 150 and the plastic lens element 160, wherein structures, surface shapes and so on of the first lens element 110, the second lens element 120, the third lens element 130, the fourth lens element 140 and the fifth lens element 150 can be disposed according to different imaging demand, and the structures, the surface shapes and so on are not important to the present disclosure, and will not disclose details thereof herein.

The plastic lens element 160, in order from a center to a peripheral region thereof, includes an optical effective portion 161 and a peripheral portion 162, wherein the optical axis X passes through the optical effective portion 161, and the peripheral portion 162 surrounds the optical effective portion 161. A side of at least one of an object side and an image side of the peripheral portion 162 includes a plurality of step structures 163, and the step structures 163 are interposed between the side of the at least one of the object side and the image side of the peripheral portion 162 and a same side of the optical effective portion 161. Via the step structures 163, a distance can be kept between the optical effective portion 161 and the adjacent peripheral portion 162 along a direction parallel to the optical axis X.

The carrier element 170 can be a plastic lens barrel or a single element which the plastic lens barrel integrally formed with a carrier via an injection molding. According to the 1st example, the carrier element 170 is the plastic lens barrel, but is not limited thereto.

The carrier element 170 includes a tip end minimal opening 171 and a plurality of annular inner walls 172, wherein the optical axis X passes through the tip end minimal opening 171. Diameters of the annular inner walls 172 vertical to the optical axis X are different, wherein at least one of the annular inner walls 172 faces towards the plastic lens element 160. Furthermore, the annular inner walls 172 facing towards the plastic lens element 160 can be regarded that the annular inner walls 172 are overlapped the plastic lens element 160 at a direction vertical to the optical axis X.

The light absorbing layer 180 is disposed on the peripheral portion 162 of the plastic lens element 160, the step structures 163 and the annular inner walls 172 facing towards the plastic lens element 160. Therefore, the plastic lens element 160 is connected to the optical effective portion 161 and the peripheral portion 162 via the step structures 163, and the liquid light absorbing layer 180 can sufficiently surround the optical effective portion 161.

In FIG. 1A, a portion of the light absorbing layer 180 is disposed on the annular inner walls 172 facing towards the plastic lens element 160 to form an annular concave arc 181. The light absorbing layer 180 is for retaining the plastic lens element 160 in the inner space of the carrier element 170. The annular concave arc 181 can be an open ring, and a cross section of the annular concave arc 181 is still a concave arc shape. Therefore, the liquid light absorbing layer 180 solidifies to form a light blocking cover with high blocking efficiency, and the light absorbing layer 180 after solidifying has the reliability of remaining the plastic lens element 160. Hence, the light absorbing layer 180 can be used as a retainer to proceed an assembling operation of the imaging lens assembly module. Simultaneously, a volume of the light absorbing layer 180 is smaller than a volume of a plastic retainer with a fixed shape, and the non-imaging light can be more effectively blocked via the light absorbing layer 180.

The tip end minimal opening 171 is disposed on an object side of the plastic lens element 160, and the light absorbing layer 180 is disposed on the image side of the plastic lens element 160 to surround the optical effective portion 161 of the image side of the plastic lens element 160. Moreover, a shape of the tip end minimal opening 171 is different from an opening shape of the light absorbing layer 180. Therefore, it can be regarded that the light blocking cover is disposed on an area of the imaging lens assembly module near the image surface 190. That is, excluding the necessary imaging light, the non-imaging light is captured via the light blocking cover as possible to avoid the further reflection of the non-imaging light. Hence, the better efficiency of capturing the non-imaging light can be achieved via a disposition position of the light absorbing layer 180 and a relative location of an entrance pupil of the imaging lens assembly module according to the 1st example.

In FIGS. 1A and 1B, the object side of the plastic lens element 160 can further include an object-side receiving surface 164 for receiving a lens element adjacent the object side of the plastic lens element 160, and the object-side receiving surface 164 is a circular ring shape. According to the 1st example, the lens element adjacent the object side of the plastic lens element 160 is the fifth lens element 150. Therefore, a force on the plastic lens element 160 can be even, the risk of decreasing the precision level of forming the optical effective portion 161 can be decreased, and the circular symmetry, the precision level and the consistence of the optical effective portion 161 of the object-side surface can be better via the circular ring shape.

Figure 1C:
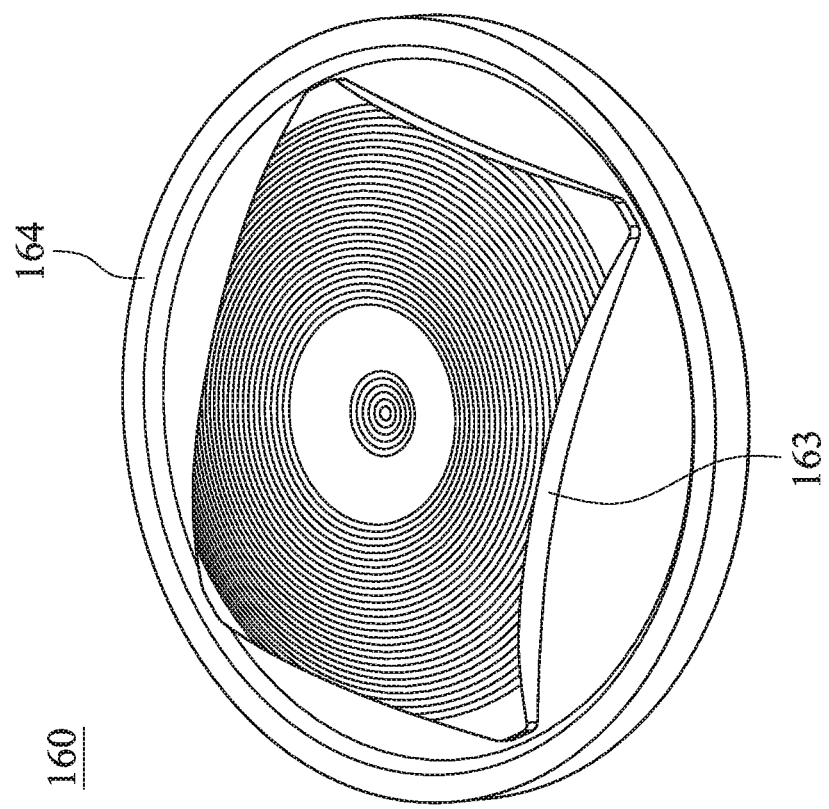
FIG. 1C is a schematic view of an image-side surface of the plastic lens element according to the 1st example in FIG. 1A.
Figure 1D:
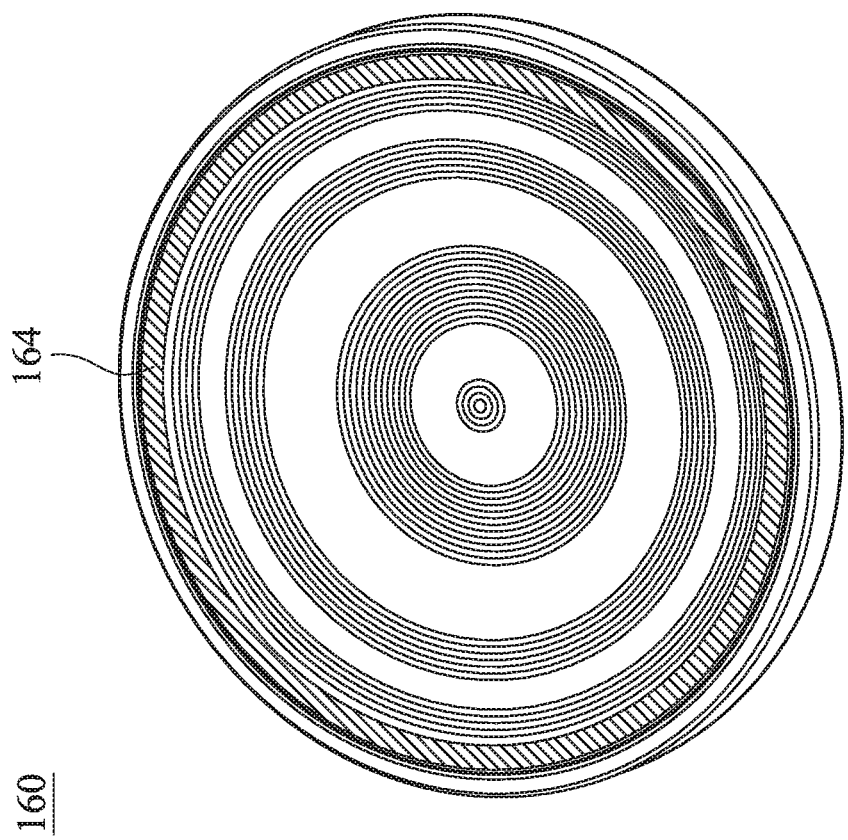
FIG. 1D is a schematic view of an object-side surface of the plastic lens element according to the 1st example in FIG. 1A.

FIG. 1C is a schematic view of an image-side surface of the plastic lens element 160 according to the 1st example in FIG. 1A. FIG. 1D is a schematic view of an object-side surface of the plastic lens element 160 according to the 1st example in FIG. 1A. In FIGS. 1C and 1D, the step structures 163 are for separating the optical effective portion 161 and the peripheral portion 162, an outer contour is formed on the side of the optical effective portion 161, and the outer contour can be different from an outer contour formed on the other side of the optical effective portion 161. According to the 1st example, the outer contour of the optical effective portion 161 of an object side is circle, and the outer contour of the optical effective portion 161 of an image side is polygonal because the step structures 163 are interposed on the optical effective portion 161 of the image side. In detail, the outer contour of the optical effective portion 161 of the image side is a quadrilateral with R-angle treatment to form the polygonal outer contour of the optical effective portion 161 of the image side. Therefore, the light absorbing layer 180 can be coated on an ideal position of the plastic lens element 160, and a blocking range of the light blocking cover can be increased. Moreover, a coating method of the present disclosure does not be limited by the coating method of prior art that must be along an annular track.

Figure 1E:
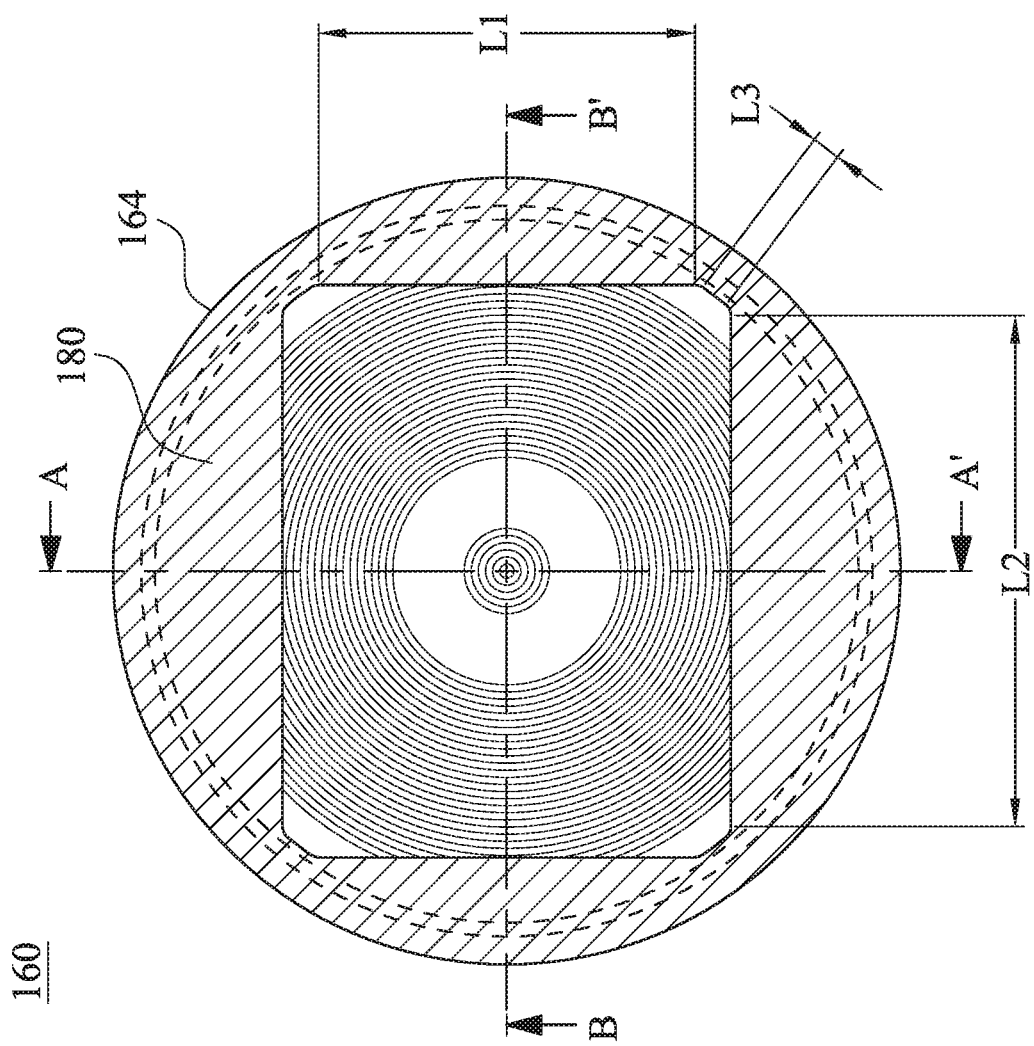
FIG. 1E is a top view of an image-side surface of the plastic lens element according to the 1st example in FIG. 1A.

FIG. 1E is a top view of an image-side surface of the plastic lens element 160 according to the 1st example in FIG. 1A. In FIG. 1E, the outer contour of the optical effective portion 161 can be polygonal via the step structures 163, and the liquid light absorbing layer 180 solidifies can sufficiently surround the optical effective portion 161 to be coated on the step structures 163 and the peripheral portion 162. Hence, a polygonal inner opening corresponding to the outer contour of the optical effective portion 161 is formed. Furthermore, according to the 1st example, an opening shape of the light absorbing layer 180 can be a polygon, that is, the light absorbing layer 180 includes a plurality of lengths. In detail, the opening shape of the light absorbing layer 180 is octagon, that is, the light absorbing layer 180 includes eight lengths. It can be regarded as the engineering consideration that is used to improve the glare from the light absorbing layer 180. Moreover, at least two of the eight lengths can be different, and even at least three of the eight lengths can be different. Therefore, the light-blocking absorbing layer of a larger blocking range can be manufactured, a number of the lengths can be ideally controlled, and the possibility of mass production can be increased. In detail, according to the 1st example, three of the eight lengths of the opening of the light absorbing layer 180 are different, which are a length L1, a length L2 and a length L3, wherein the length L1 is 2.73 mm, and a number of the lengths L1 is two; the length L2 is 3.71 mm, and a number of the lengths L2 is two; the length L3 is 0.21 mm, and a number of the lengths L3 is four.

Figure 1G:
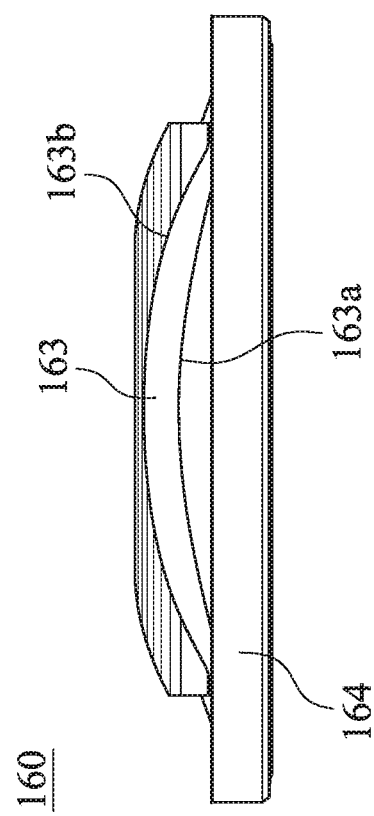
FIG. 1G is a cross-sectional schematic view of a B-B' direction of the plastic lens element according to the 1st example in FIG. 1E.
Figure 1F:
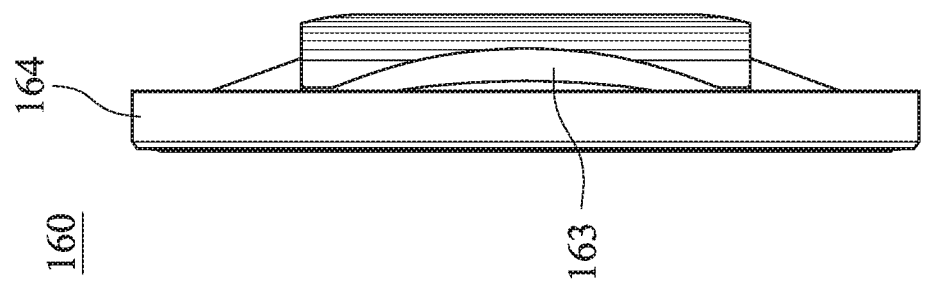
FIG. 1F is a cross-sectional schematic view of an A-A' direction of the plastic lens element according to the 1st example in FIG. 1E.

FIG. 1F is a cross-sectional schematic view of an A-A' direction of the plastic lens element 160 according to the 1st example in FIG. 1E. FIG. 1G is a cross-sectional schematic view of a B-B' direction of the plastic lens element 160 according to the 1st example in FIG. 1E. In FIGS. 1F and 1G, the step structures 163 can be an arc structure. Therefore, the step structures 163 can be flexibly cooperated with a structure of the optical effective portion 161, and a geometric shape of a portion of the optical effective portion 161 close the step structures 163 can be avoid being excessively different to decrease the risk of molding failure. Furthermore, the step structures 163 can include a first arc structure 163a and a second arc structure 163b, the first arc structure 163a is located on the peripheral portion 162, and the second arc structure 163b is located on the outer contour of the optical effective portion 161. In detail, the first arc structure 163a is relatively closer to the object side of the plastic lens element 160 than the second arc structure 163b to the object side of the plastic lens element 160, and the first arc structure 163a is flexibly cooperated with the second arc structure 163b. Therefore, a surface of partial large of the step structures 163 can be avoided, and a travelling path of the highly reflective non-imaging light can be further avoided.

Both of a center to a peripheral region of the first arc structure 163a and a center to a peripheral region of the second arc structure 163b bend from an image side of the imaging lens assembly module to an object side of the imaging lens assembly module. In detail, both of the center to the peripheral region of the first arc structure 163a and the center to the peripheral region of the second arc structure 163b can bend from the image side of the imaging lens assembly module to the object side of the imaging lens assembly module according to the structure of the plastic lens element 160. Therefore, it is favorable for decreasing the possibility of partially and substantially accumulating the light intensity of surface reflection.

In FIGS. 1B and 1E, according to the 1st example, when a height difference between each of the step structures 163 parallel to a direction of the optical axis X is h, h is 0.25 mm, and the step structures 163 can have uneven heights. Therefore, it is favorable for fitting an outer peripheral portion of the optical effective portion 161 to decrease the failure ratio of the injection molding of the plastic lens element 160.

2nd Example

Figure 2A:
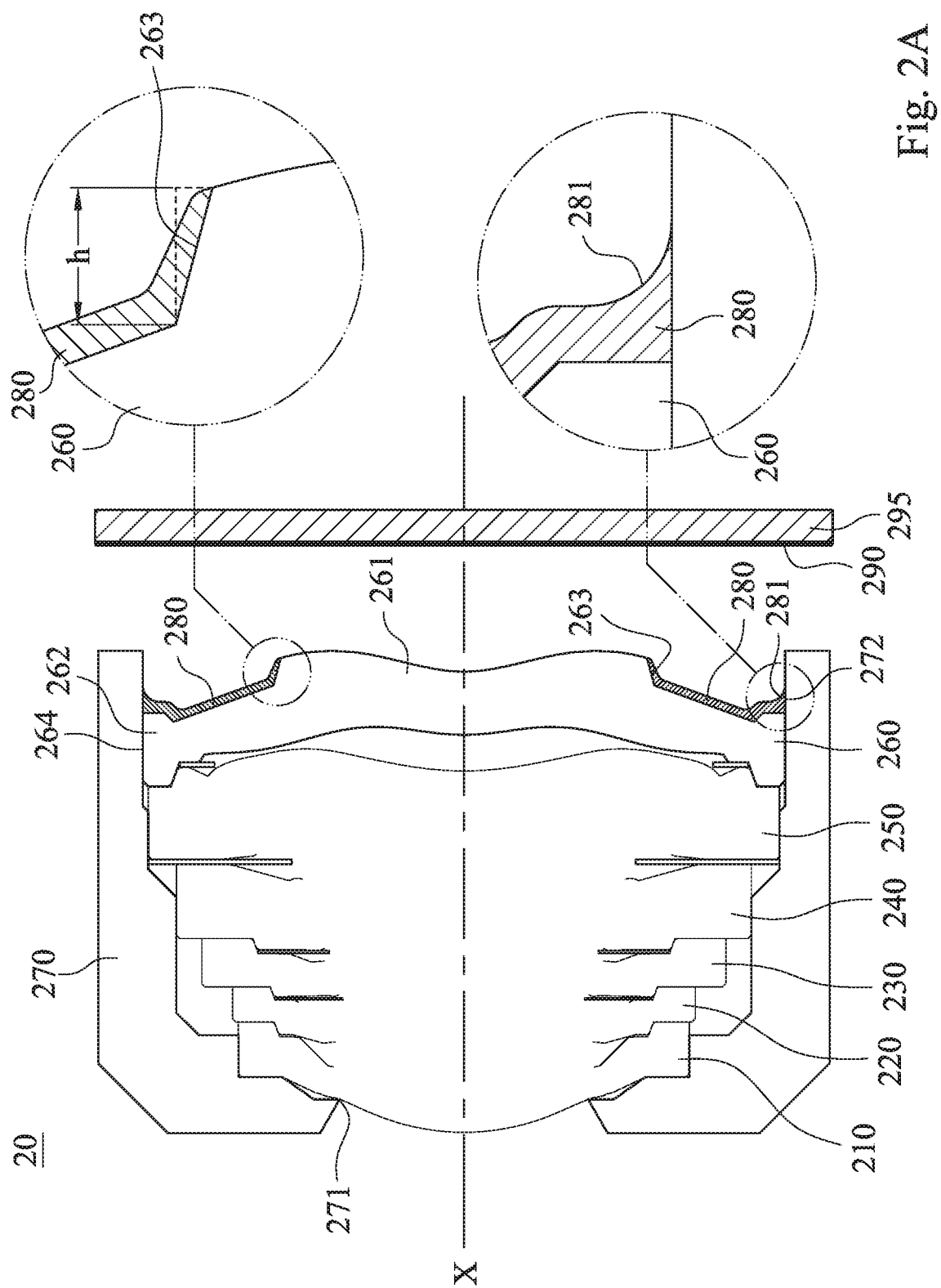
FIG. 2A is a schematic view of an electronic device according to the 2nd example of the present disclosure.

FIG. 2A is a schematic view of an electronic device 20 according to the 2nd example of the present disclosure. In FIG. 2A, the electronic device 20 (in detail, a camera unit of the electronic device 20) includes an imaging lens assembly module (its reference numeral is omitted) and an image sensor 295. The imaging lens assembly module has an optical axis X, and includes a plurality of lens elements, at least one plastic lens element 260, a carrier element 270, a light absorbing layer 280 and an image surface 290, wherein the carrier element 270 defines an inner space for disposing the lens elements and the plastic lens element 260, and the image surface 290 is located on an image side of the carrier element 270. The image sensor 295 is disposed on the image surface 290 of the imaging lens assembly module.

In detail, according to the 2nd example, the imaging lens assembly module, in order from an object side to an image side, includes a first lens element 210, a second lens element 220, a third lens element 230, a fourth lens element 240, a fifth lens element 250 and the plastic lens element 260, wherein structures, surface shapes and so on of the first lens element 210, the second lens element 220, the third lens element 230, the fourth lens element 240 and the fifth lens element 250 can be disposed according to different imaging demand, and the structures, the surface shapes and so on are not important to the present disclosure, and will not disclose details thereof herein.

The plastic lens element 260, in order from a center to a peripheral region thereof, includes an optical effective portion 261 and a peripheral portion 262, wherein the optical axis X passes through the optical effective portion 261, and the peripheral portion 262 surrounds the optical effective portion 261.

The carrier element 270 can be a plastic lens barrel or a single element which the plastic lens barrel integrally formed with a carrier via an injection molding. According to the 2nd example, the carrier element 270 is the plastic lens barrel, but is not limited thereto.

The carrier element 270 includes a tip end minimal opening 271 and a plurality of annular inner walls 272, wherein the optical axis X passes through the tip end minimal opening 271. Diameters of the annular inner walls 272 vertical to the optical axis X are different, wherein at least one of the annular inner walls 272 faces towards the plastic lens element 260. Furthermore, the annular inner walls 272 facing towards the plastic lens element 260 can be regarded that the annular inner walls 272 are overlapped the plastic lens element 260 at a direction vertical to the optical axis X.

In FIG. 2A, a portion of the light absorbing layer 280 is disposed on the annular inner walls 272 facing towards the plastic lens element 260 to form an annular concave arc 281. The light absorbing layer 280 is for retaining the plastic lens element 260 in the inner space of the carrier element 270. The annular concave arc 281 can be an open ring, and a cross section of the annular concave arc 281 is still a concave arc shape. Therefore, the liquid light absorbing layer 280 solidifies to form a light blocking cover with high blocking efficiency, and the light absorbing layer 280 after solidifying has the reliability of remaining the plastic lens element 260. Hence, the light absorbing layer 280 can be used as a retainer to proceed an assembling operation of the imaging lens assembly module. Simultaneously, a volume of the light absorbing layer 280 is smaller than a volume of a plastic retainer with a fixed shape, and the non-imaging light can be more effectively blocked via the light absorbing layer 280.

The tip end minimal opening 271 is disposed on an object side of the plastic lens element 260, and the light absorbing layer 280 is disposed on the image side of the plastic lens element 260 to surround the optical effective portion 261 of the image side of the plastic lens element 260. Moreover, a shape of the tip end minimal opening 271 is different from an opening shape of the light absorbing layer 280. Therefore, it can be regarded that the light blocking cover is disposed on an area of the imaging lens assembly module near the image surface 290. That is, excluding the necessary imaging light, the non-imaging light is captured via the light blocking cover as possible to avoid the further reflection of the non-imaging light. Hence, the better efficiency of capturing the non-imaging light can be achieved via a disposition position of the light absorbing layer 280 and a relative location of an entrance pupil of the imaging lens assembly module according to the 2nd example.

The object side of the plastic lens element 260 can further include an object-side receiving surface 264 for receiving a lens element adjacent the object side of the plastic lens element 260, and the object-side receiving surface 264 is a circular ring shape. According to the 2nd example, the lens element adjacent the object side of the plastic lens element 260 is the fifth lens element 250. Therefore, a force on the plastic lens element 260 can be even, the risk of decreasing the precision level of forming the optical effective portion 261 can be decreased, and the circular symmetry, the precision level and the consistence of the optical effective portion 261 of the object-side surface can be better via the circular ring shape.

Figure 2B:
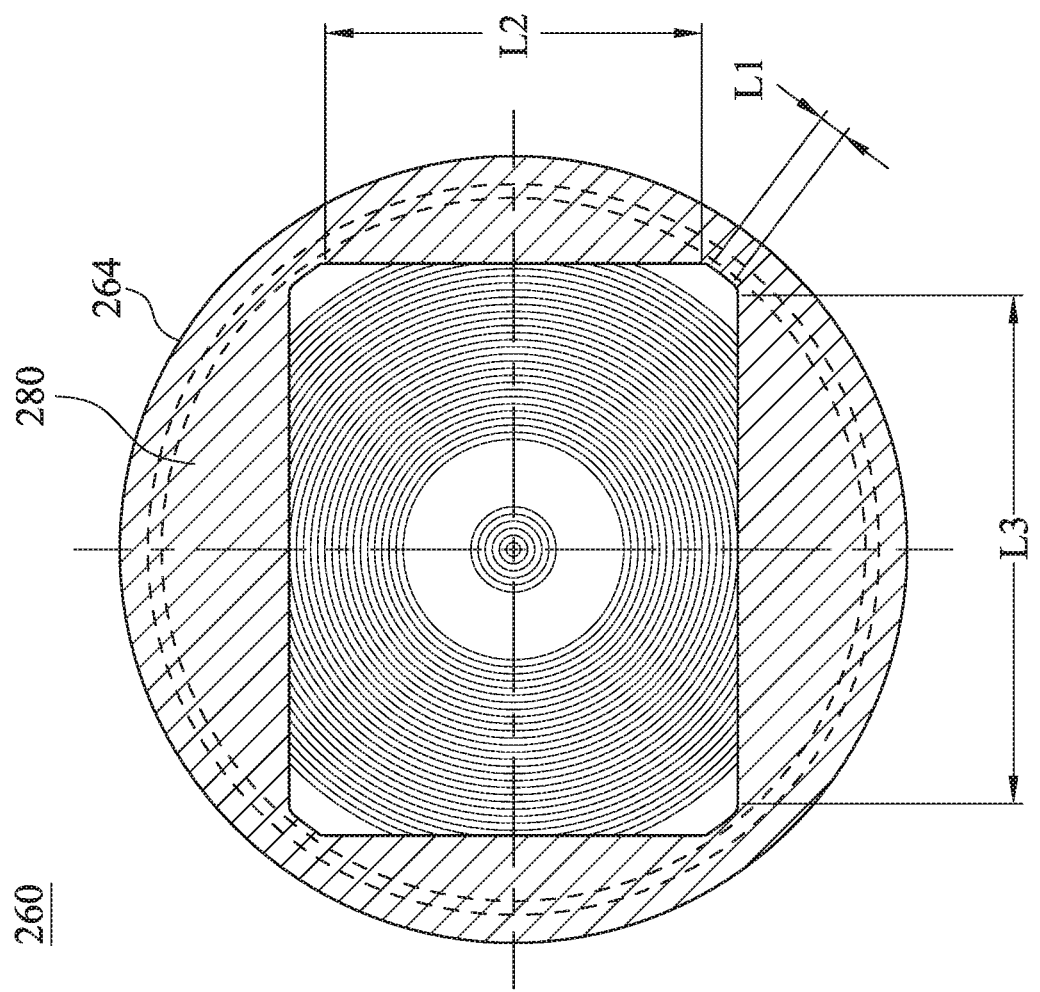
FIG. 2B is a top view of an image-side surface of the plastic lens element according to the 2nd example in FIG. 2A.

FIG. 2B is a top view of an image-side surface of the plastic lens element 260 according to the 2nd example in FIG. 2A. In FIG. 2B, according to the 2nd example, an opening shape of the light absorbing layer 280 can be a polygon, that is, the light absorbing layer 280 includes a plurality of lengths. In detail, the opening shape of the light absorbing layer 280 is octagon, that is, the light absorbing layer 280 includes eight lengths. It can be regarded as the engineering consideration that is used to improve the glare from the light absorbing layer 280. Moreover, at least two of the eight lengths can be different, and even at least three of the eight lengths can be different. Therefore, the light-blocking absorbing layer of a larger blocking range can be manufactured, a number of the lengths can be ideally controlled, and the possibility of mass production can be increased. In detail, according to the 2nd example, three of the eight lengths of the opening of the light absorbing layer 280 are different, which are a length L1, a length L2 and a length L3, wherein the length L1 is 0.2 mm, and a number of the lengths L1 is four; the length L2 is 2.73 mm, and a number of the lengths L2 is two; the length L3 is 3.69 mm, and a number of the lengths L3 is two.

A side of at least one of an object side and an image side of the peripheral portion 262 includes a plurality of step structures 263, and the step structures 263 are interposed between the side of the at least one of the object side and the image side of the peripheral portion 262 and a same side of the optical effective portion 261. Via the step structures 263, a distance can be kept between the optical effective portion 261 and the adjacent peripheral portion 262 along a direction parallel to the optical axis X. Therefore, the precision level of the polygonal opening of the light absorbing layer 280 can be increased, and the accumulated light absorbing layer 280 can be avoid forming the surface spheroidization. If the surface spheroidization is formed, the non-imaging light cannot be reduced.

The light absorbing layer 280 is disposed on the peripheral portion 262 of the plastic lens element 260, the step structures 263 and the annular inner walls 272 facing towards the plastic lens element 260, wherein the light absorbing layer 280 on the step structures 263 can have an uneven thickness. Therefore, the plastic lens element 260 is connected to the optical effective portion 261 and the peripheral portion 262 via the step structures 263, and the liquid light absorbing layer 280 can sufficiently surround the optical effective portion 261. Also, an appearance of the accumulated light absorbing layer 280 can be controlled, and it is favorable for increasing the efficiency of the light absorbing layer 280 absorbing the visible light.

In FIGS. 2A and 2B, according to the 2nd example, when a height difference between each of the step structures 263 parallel to a direction of the optical axis X is h, h is 0.24 mm, and the step structures 263 can have uneven heights. Therefore, it is favorable for fitting an outer peripheral portion of the optical effective portion 261 to decrease the failure ratio of the injection molding of the plastic lens element 260.

3rd Example

Figure 3A:
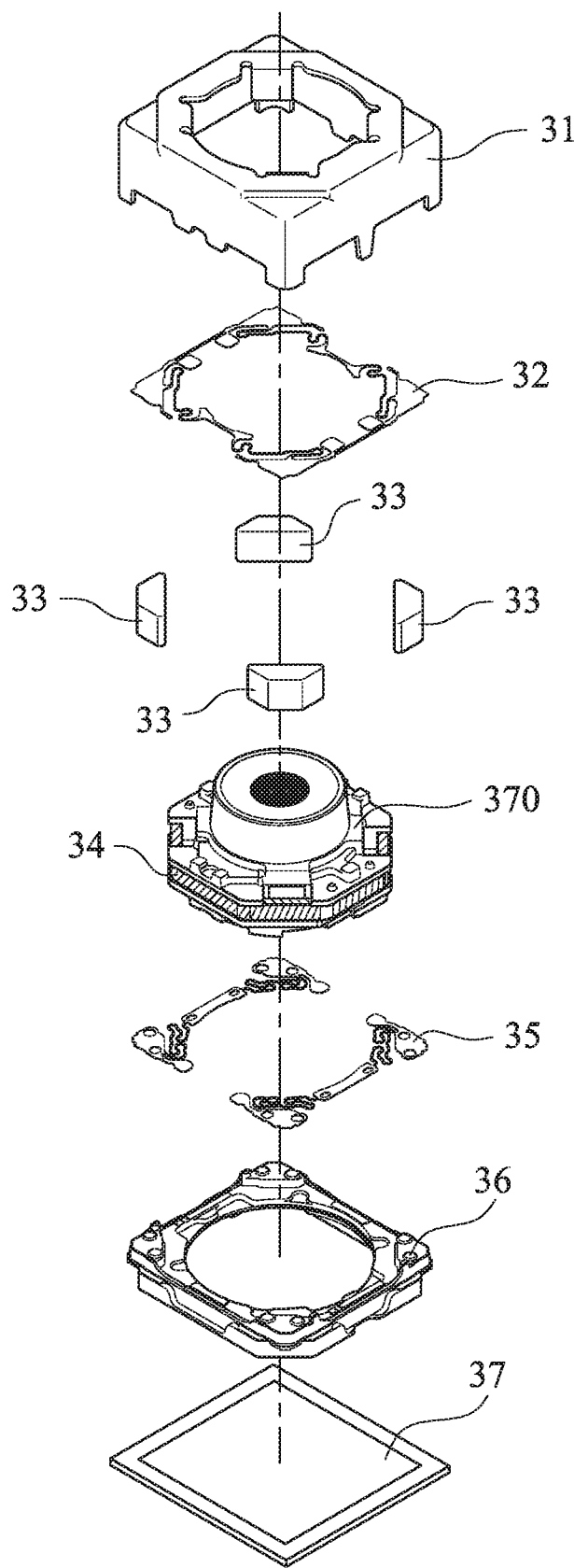
FIG. 3A is an exploded view of an electronic device according to the 3rd example of the present disclosure.
Figure 3B:
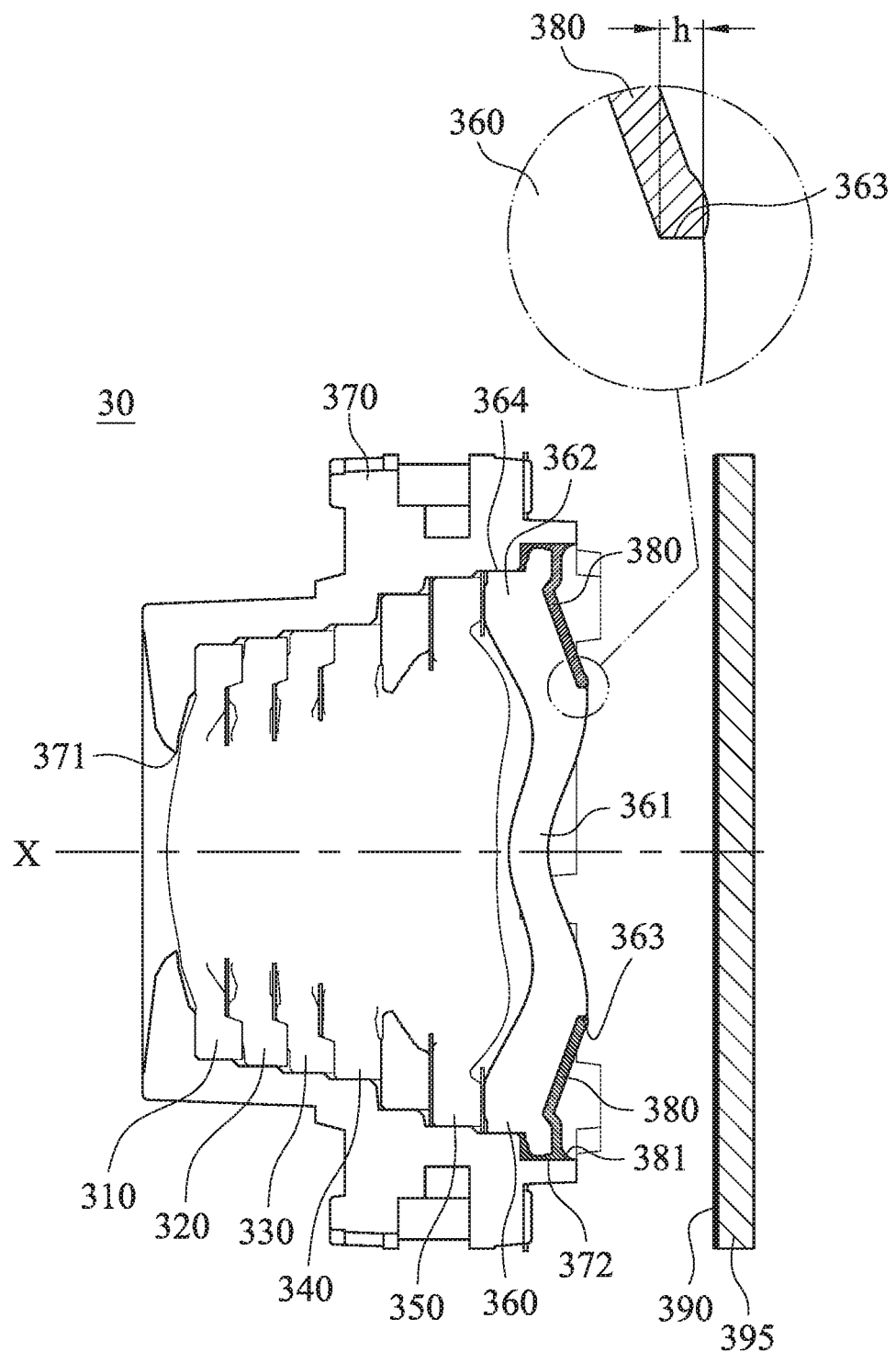
FIG. 3B is a schematic view of the electronic device according to the 3rd example in FIG. 3A.
Figure 3C:
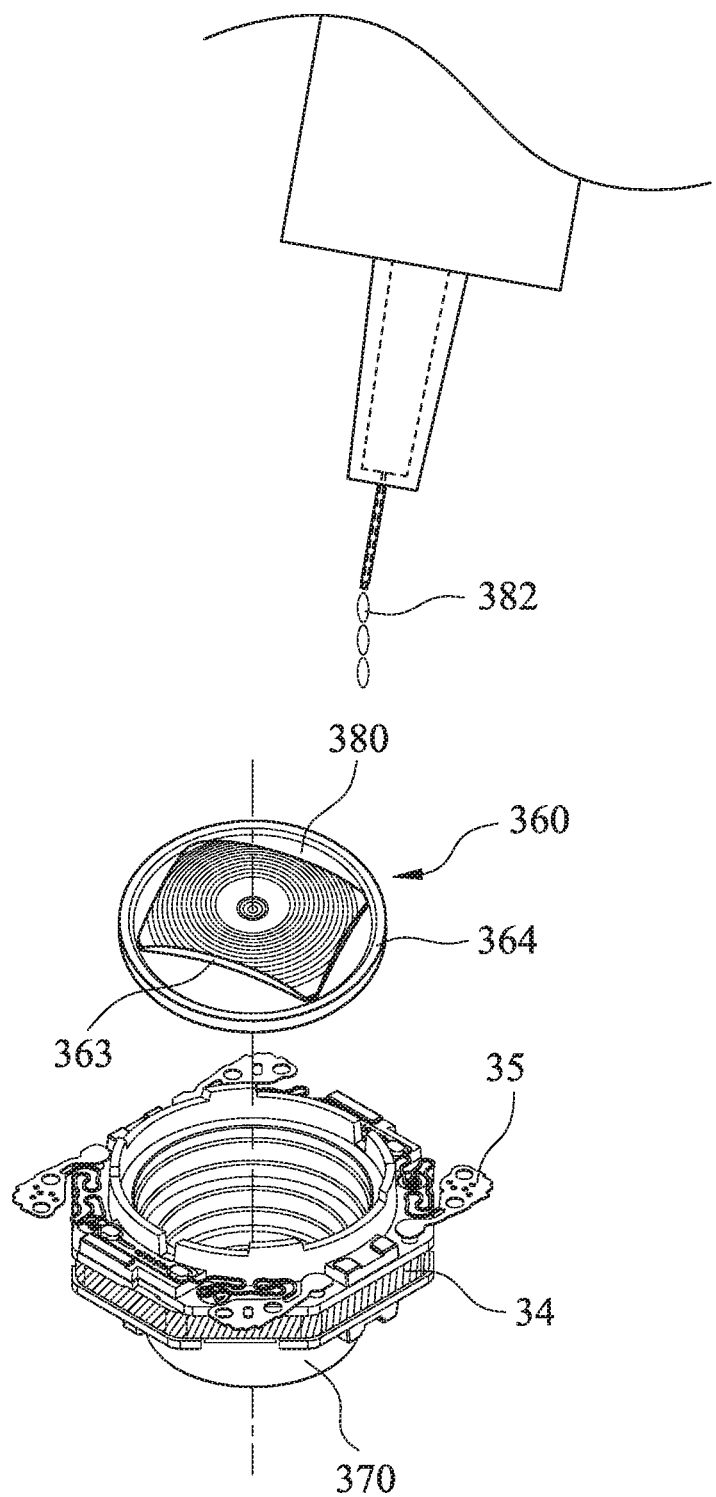
FIG. 3C is a schematic view of coating via a light absorbing layer according to the 3rd example in FIG. 3A.

FIG. 3A is an exploded view of an electronic device 30 according to the 3rd example of the present disclosure. FIG. 3B is a schematic view of the electronic device 30 according to the 3rd example in FIG. 3A. FIG. 3C is a schematic view of coating via a light absorbing layer 380 according to the 3rd example in FIG. 3A. In FIG. 3A, the electronic device 30 includes a cover 31, an upper spring leaf 32, a plurality of magnets 33, an imaging lens assembly module (its reference numeral is omitted), a coil 34, a lower spring leaf 35 and a holder 36, and the electronic device 30 is connected to a photosensitive area 37.

The cover 31 is coupled with the holder 36. A plastic lens barrel is integrally formed with a carrier via an injection molding to form a carrier element 370, which is coaxial (that is, along an optical axis X). The carrier element 370 is disposed in the cover 31, and the carrier element 370 can be used to assemble with one of the magnet 33 and the coil 34. The holder 36 has a central opening (its reference numeral is omitted), and the cover 31 has an opening (its reference numeral is omitted), wherein the opening of the cover 31 is corresponding to the central opening of the holder 36. The carrier element 370 has an inner space (its reference numeral is omitted), and the inner space is for receiving a plurality of lens elements and at least one plastic lens element 360. The coil 34 is connected to the carrier element 370, and the coil 34 can surround and be fixed on an outer torus of the carrier element 370. The magnet 33 has a surface facing towards the coil 34. The upper spring leaf 32 is disposed between the magnet 33 and the cover 31, the lower spring leaf 35 is disposed between the imaging lens assembly module and the holder 36, and the upper spring leaf 32 and the lower spring leaf 35 are both disposed along a direction of the optical axis X. The upper spring leaf 32 and the lower spring leaf 35 are connected to the carrier element 370, respectively. The upper spring leaf 32 and the lower spring leaf 35 are for supporting the carrier element 370, and the carrier element 370 can move along a direction parallel to the optical axis X. Therefore, it is favorable for achieving the space disposition of compact size and maintaining the stability of autofocus. Furthermore, the coil 34 can be connected to a side of the carrier element 370, which is close to the holder 36.

In FIG. 3B, the imaging lens assembly module has the optical axis X, and includes the lens elements, the plastic lens element 360, the carrier element 370, a light absorbing layer 380 and an image surface 390, wherein the carrier element 370 defines an inner space for disposing the lens elements and the plastic lens element 360, and the image surface 390 is located on an image side of the carrier element 370. The image sensor 395 is disposed on the image surface 390 of the imaging lens assembly module, and the photosensitive area 37 of the image sensor 395 is a rectangle, wherein a long side of the rectangle is corresponding to a longest side of a polygon. Therefore, it is favorable for further capturing the non-imaging light near the image sensor 395 to decrease the possibility of the non-imaging light wandering and diffusing.

In detail, according to the 3rd example, the imaging lens assembly module, in order from an object side to an image side, includes a first lens element 310, a second lens element 320, a third lens element 330, a fourth lens element 340, a fifth lens element 350 and the plastic lens element 360, wherein structures, surface shapes and so on of the first lens element 310, the second lens element 320, the third lens element 330, the fourth lens element 340 and the fifth lens element 350 can be disposed according to different imaging demand, and the structures, the surface shapes and so on are not important to the present disclosure, and will not disclose details thereof herein.

The plastic lens element 360, in order from a center to a peripheral region thereof, includes an optical effective portion 361 and a peripheral portion 362, wherein the optical axis X passes through the optical effective portion 361, and the peripheral portion 362 surrounds the optical effective portion 361. A side of at least one of an object side and an image side of the peripheral portion 362 includes a plurality of step structures 363, and the step structures 363 are interposed between the side of the at least one of the object side and the image side of the peripheral portion 362 and a same side of the optical effective portion 361. Via the step structures 363, a distance can be kept between the optical effective portion 361 and the adjacent peripheral portion 362 along the direction parallel to the optical axis X.

The carrier element 370 includes a tip end minimal opening 371 and a plurality of annular inner walls 372, wherein the optical axis X passes through the tip end minimal opening 371. Diameters of the annular inner walls 372 vertical to the optical axis X are different, wherein at least one of the annular inner walls 372 faces towards the plastic lens element 360. Furthermore, the annular inner walls 372 facing towards the plastic lens element 360 can be regarded that the annular inner walls 372 are overlapped the plastic lens element 360 at a direction vertical to the optical axis X.

In FIG. 3B, the light absorbing layer 380 is disposed on the peripheral portion 362 of the plastic lens element 360, the step structures 363 and the annular inner walls 372 facing towards the plastic lens element 360. Therefore, the plastic lens element 360 is connected to the optical effective portion 361 and the peripheral portion 362 via the step structures 363, and the liquid light absorbing layer 380 can sufficiently surround the optical effective portion 361.

In detail, a portion of the light absorbing layer 380 is disposed on the annular inner walls 372 facing towards the plastic lens element 360 to form an annular concave arc 381. The light absorbing layer 380 is for retaining the plastic lens element 360 in the inner space of the carrier element 370. The annular concave arc 381 can be an open ring, and a cross section of the annular concave arc 381 is still a concave arc shape. Meanwhile, a volume of the light absorbing layer 380 is smaller than a volume of a plastic retainer with a fixed shape, and the non-imaging light can be more effectively blocked via the light absorbing layer 380.

In FIGS. 3B and 3C, during an assembling process of the electronic device 30, the first lens element 310, the second lens assembly 320, the third lens element 330, the fourth lens element 340, the fifth lens element 350 and the plastic lens element 360 are assembled in the carrier element 370 in order, and a needle (its reference numeral is omitted) is placed above the plastic lens element 360 (the lens elements assembled in the carrier element 370 are omitted in FIG. 3C to clearly show the carrier element 370), and the needle and the carrier element 370 together with the plastic lens element 360 have degrees of freedom to move or rotate relatively by fixtures (not shown) for a liquid light absorbing coating material 382 to be intermittently applied on an image-side surface of the plastic lens element 360 to form the light absorbing layer 380. For example, the liquid light absorbing coating material 382 can be applied on a plurality of positions of the image-side surface of the plastic lens element 360. In detail, the plastic lens element 360 is connected to the carrier element 370 via the liquid light absorbing coating material 382, wherein a material of the liquid light absorbing coating material 382 can be black opaque. The liquid light absorbing coating material 382 is mainly applied on the carrier element 370 and a range without the optical effective portion 361 of an image-side surface of the plastic lens element 360 via the peripheral portion 362, the step structures 363 and the annular inner walls 372 to achieve an effect of the plastic lens element 360 fixed on the carrier element 370. Therefore, the liquid light absorbing layer 380 solidifies to form a light blocking cover with high blocking efficiency, and the light absorbing layer 380 after solidifying has the reliability of remaining the plastic lens element 360. Hence, the light absorbing layer 380 can be used as a retainer to proceed an assembling operation of the imaging lens assembly module.

The tip end minimal opening 371 is disposed on an object side of the plastic lens element 360, and the light absorbing layer 380 is disposed on the image side of the plastic lens element 360 to surround the optical effective portion 361 of the image side of the plastic lens element 360. Moreover, a shape of the tip end minimal opening 371 is different from an opening shape of the light absorbing layer 380. Therefore, it can be regarded that the light blocking cover is disposed on an area of the imaging lens assembly module near the image surface 390. That is, excluding the necessary imaging light, the non-imaging light is captured via the light blocking cover as possible to avoid the further reflection of the non-imaging light. Hence, the better efficiency of capturing the non-imaging light can be achieved via a disposition position of the light absorbing layer 380 and a relative location of an entrance pupil of the imaging lens assembly module according to the 3rd example.

In FIG. 3B, the object side of the plastic lens element 360 can further include an object-side receiving surface 364 for receiving a lens element adjacent the object side of the plastic lens element 360, and the object-side receiving surface 364 is a circular ring shape. According to the 3rd example, the lens element adjacent the object side of the plastic lens element 360 is the fifth lens element 350. Therefore, a force on the plastic lens element 360 can be even, the risk of decreasing the precision level of forming the optical effective portion 361 can be decreased, and the circular symmetry, the precision level and the consistence of the optical effective portion 361 of the object-side surface can be better via the circular ring shape.

In FIG. 3B, according to the 3rd example, when a height difference between each of the step structures 363 parallel to a direction of the optical axis X is h, h is 0.09 mm, and the step structures 363 can have uneven heights. Therefore, it is favorable for fitting an outer peripheral portion of the optical effective portion 361 to decrease the failure ratio of the injection molding of the plastic lens element 360.

4th Example

Figure 4A:
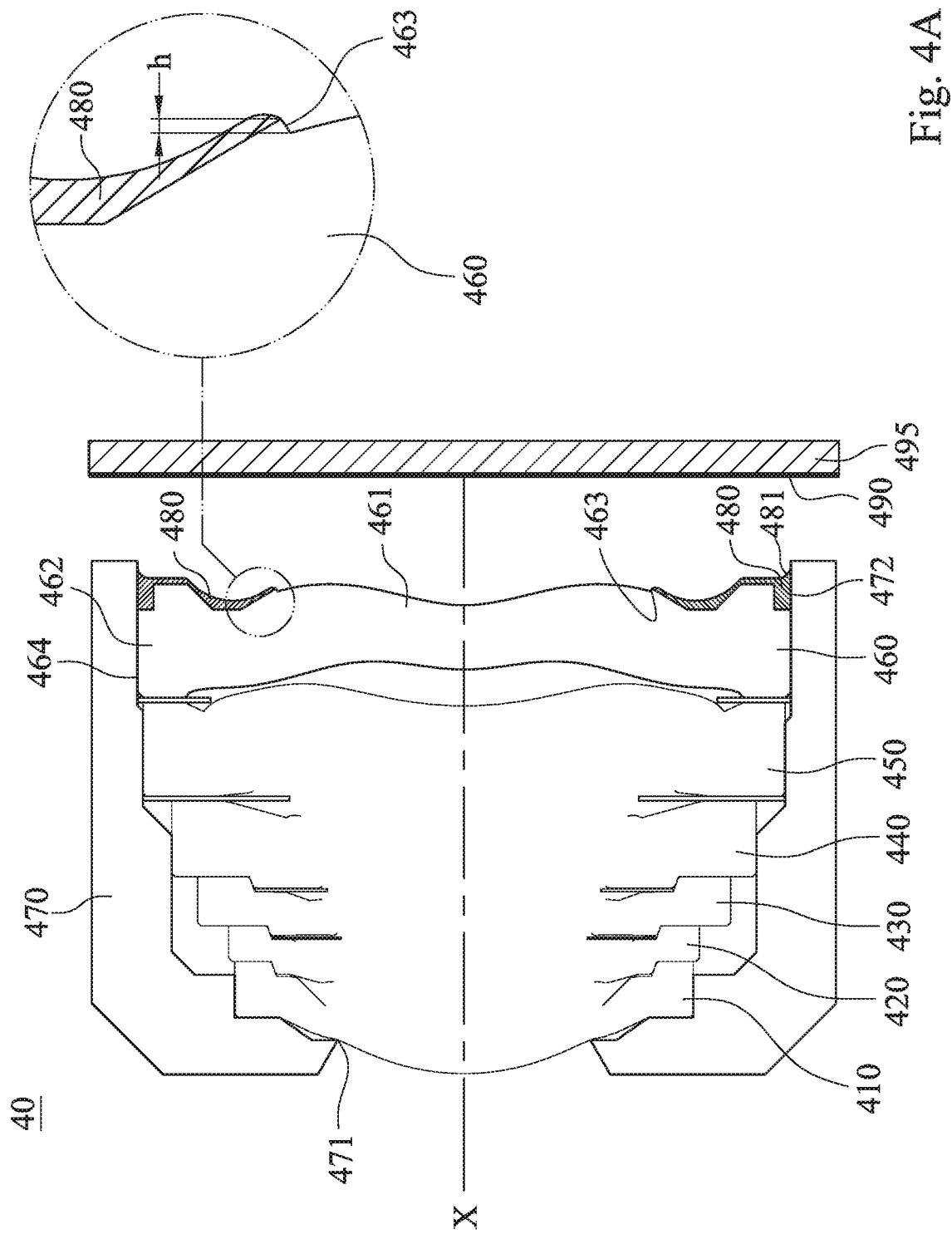
FIG. 4A is a schematic view of an electronic device according to the 4th example of the present disclosure.

FIG. 4A is a schematic view of an electronic device 40 according to the 4th example of the present disclosure. In FIG. 4A, the electronic device 40 (in detail, a camera unit of the electronic device 40) includes an imaging lens assembly module (its reference numeral is omitted) and an image sensor 495. The imaging lens assembly module has an optical axis X, and includes a plurality of lens elements, at least one plastic lens element 460, a carrier element 470, a light absorbing layer 480 and an image surface 490, wherein the carrier element 470 defines an inner space for disposing the lens elements and the plastic lens element 460, and the image surface 490 is located on an image side of the carrier element 470. The image sensor 495 is disposed on the image surface 490 of the imaging lens assembly module.

In detail, according to the 4th example, the imaging lens assembly module, in order from an object side to an image side, includes a first lens element 410, a second lens element 420, a third lens element 430, a fourth lens element 440, a fifth lens element 450 and the plastic lens element 460, wherein structures, surface shapes and so on of the first lens element 410, the second lens element 420, the third lens element 430, the fourth lens element 440 and the fifth lens element 450 can be disposed according to different imaging demand, and the structures, the surface shapes and so on are not important to the present disclosure, and will not disclose details thereof herein.

The plastic lens element 460, in order from a center to a peripheral region thereof, includes an optical effective portion 461 and a peripheral portion 462, wherein the optical axis X passes through the optical effective portion 461, and the peripheral portion 462 surrounds the optical effective portion 461.

The carrier element 470 can be a plastic lens barrel or a single element which the plastic lens barrel integrally formed with a carrier via an injection molding. According to the 4th example, the carrier element 470 is the plastic lens barrel, but is not limited thereto.

The carrier element 470 includes a tip end minimal opening 471 and a plurality of annular inner walls 472, wherein the optical axis X passes through the tip end minimal opening 471. Diameters of the annular inner walls 472 vertical to the optical axis X are different, wherein at least one of the annular inner walls 472 faces towards the plastic lens element 460. Furthermore, the annular inner walls 472 facing towards the plastic lens element 460 can be regarded that the annular inner walls 472 are overlapped the plastic lens element 460 at a direction vertical to the optical axis X.

In FIG. 4A, a portion of the light absorbing layer 480 is disposed on the annular inner walls 472 facing towards the plastic lens element 460 to form an annular concave arc 481. The light absorbing layer 480 is for retaining the plastic lens element 460 in the inner space of the carrier element 470. The annular concave arc 481 can be an open ring, and a cross section of the annular concave arc 481 is still a concave arc shape. Therefore, the liquid light absorbing layer 480 solidifies to form a light blocking cover with high blocking efficiency, and the light absorbing layer 480 after solidifying has the reliability of remaining the plastic lens element 460. Hence, the light absorbing layer 480 can be used as a retainer to proceed an assembling operation of the imaging lens assembly module. Simultaneously, a volume of the light absorbing layer 480 is smaller than a volume of a plastic retainer with a fixed shape, and the non-imaging light can be more effectively blocked via the light absorbing layer 480.

The tip end minimal opening 471 is disposed on an object side of the plastic lens element 460, and the light absorbing layer 480 is disposed on the image side of the plastic lens element 460 to surround the optical effective portion 461 of the image side of the plastic lens element 460. Moreover, a shape of the tip end minimal opening 471 is different from an opening shape of the light absorbing layer 480. Therefore, it can be regarded that the light blocking cover is disposed on an area of the imaging lens assembly module near the image surface 490. That is, excluding the necessary imaging light, the non-imaging light is captured via the light blocking cover as possible to avoid the further reflection of the non-imaging light. Hence, the better efficiency of capturing the non-imaging light can be achieved via a disposition position of the light absorbing layer 480 and a relative location of an entrance pupil of the imaging lens assembly module according to the 4th example.

The object side of the plastic lens element 460 can further include an object-side receiving surface 464 for receiving a lens element adjacent the object side of the plastic lens element 460, and the object-side receiving surface 464 is a circular ring shape. According to the 4th example, the lens element adjacent the object side of the plastic lens element 460 is the fifth lens element 450. Therefore, a force on the plastic lens element 460 can be even, the risk of decreasing the precision level of forming the optical effective portion 461 can be decreased, and the circular symmetry, the precision level and the consistence of the optical effective portion 461 of the object-side surface can be better via the circular ring shape.

Figure 4B:
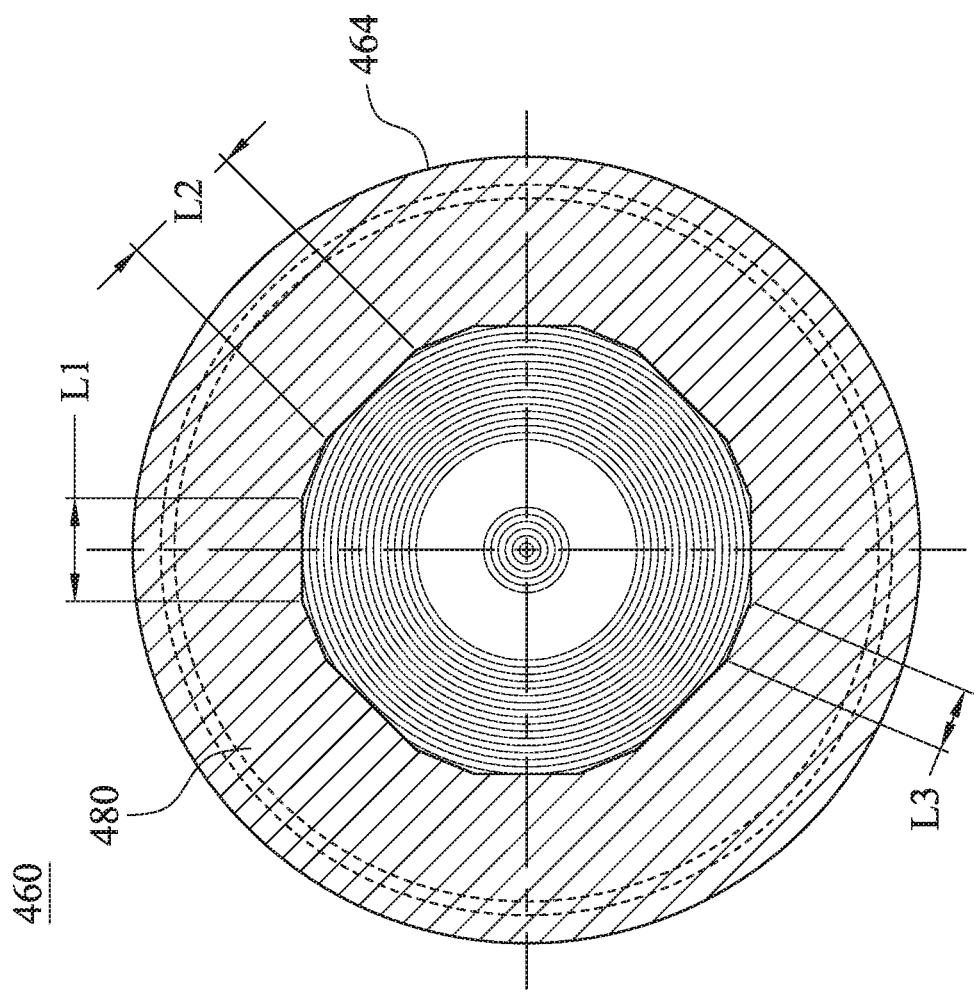
FIG. 4B is a top view of an image-side surface of the plastic lens element according to the 4th example in FIG. 4A.

FIG. 4B is a top view of an image-side surface of the plastic lens element 460 according to the 4th example in FIG. 4A. In FIG. 4B, according to the 4th example, an opening shape of the light absorbing layer 480 can be a polygon, that is, the light absorbing layer 480 includes a plurality of lengths. In detail, the opening shape of the light absorbing layer 480 is hexadecagon, that is, the light absorbing layer 480 includes sixteen lengths. It can be regarded as the engineering consideration that is used to improve the glare from the light absorbing layer 480. Moreover, at least two of the sixteen lengths can be different, and even at least three of the sixteen lengths can be different. Therefore, the light-blocking absorbing layer of a larger blocking range can be manufactured, a number of the lengths can be ideally controlled, and the possibility of mass production can be increased. In detail, according to the 4th example, three of the sixteen lengths of the opening of the light absorbing layer 480 are different, which are a length L1, a length L2 and a length L3, wherein the length L1 is 0.75 mm, and a number of the lengths L1 is four; the length L2 is 0.91 mm, and a number of the lengths L2 is four; the length L3 is 0.46 mm, and a number of the lengths L3 is eight.

A side of at least one of an object side and an image side of the peripheral portion 462 includes a plurality of step structures 463, and the step structures 463 are interposed between the side of the at least one of the object side and the image side of the peripheral portion 462 and a same side of the optical effective portion 461. Via the step structures 463, a distance can be kept between the optical effective portion 461 and the adjacent peripheral portion 462 along a direction parallel to the optical axis X. Therefore, the precision level of the polygonal opening of the light absorbing layer 480 can be increased, and the accumulated light absorbing layer 480 can be avoid forming the surface spheroidization. If the surface spheroidization is formed, the non-imaging light cannot be reduced.

The light absorbing layer 480 is disposed on the peripheral portion 462 of the plastic lens element 460, the step structures 463 and the annular inner walls 472 facing towards the plastic lens element 460, wherein the light absorbing layer 480 on the step structures 463 can have an uneven thickness. Therefore, the plastic lens element 460 is connected to the optical effective portion 461 and the peripheral portion 462 via the step structures 463, and the liquid light absorbing layer 480 can sufficiently surround the optical effective portion 461. Also, an appearance of the accumulated light absorbing layer 480 can be controlled, and it is favorable for increasing the efficiency of the light absorbing layer 480 absorbing the visible light.

In FIGS. 4A and 4B, according to the 4th example, when a height difference between each of the step structures 463 parallel to a direction of the optical axis X is h, h is 0.02 mm, and the step structures 463 can have uneven heights. Therefore, it is favorable for fitting an outer peripheral portion of the optical effective portion 461 to decrease the failure ratio of the injection molding of the plastic lens element 460.

5th Example

Figure 5A:
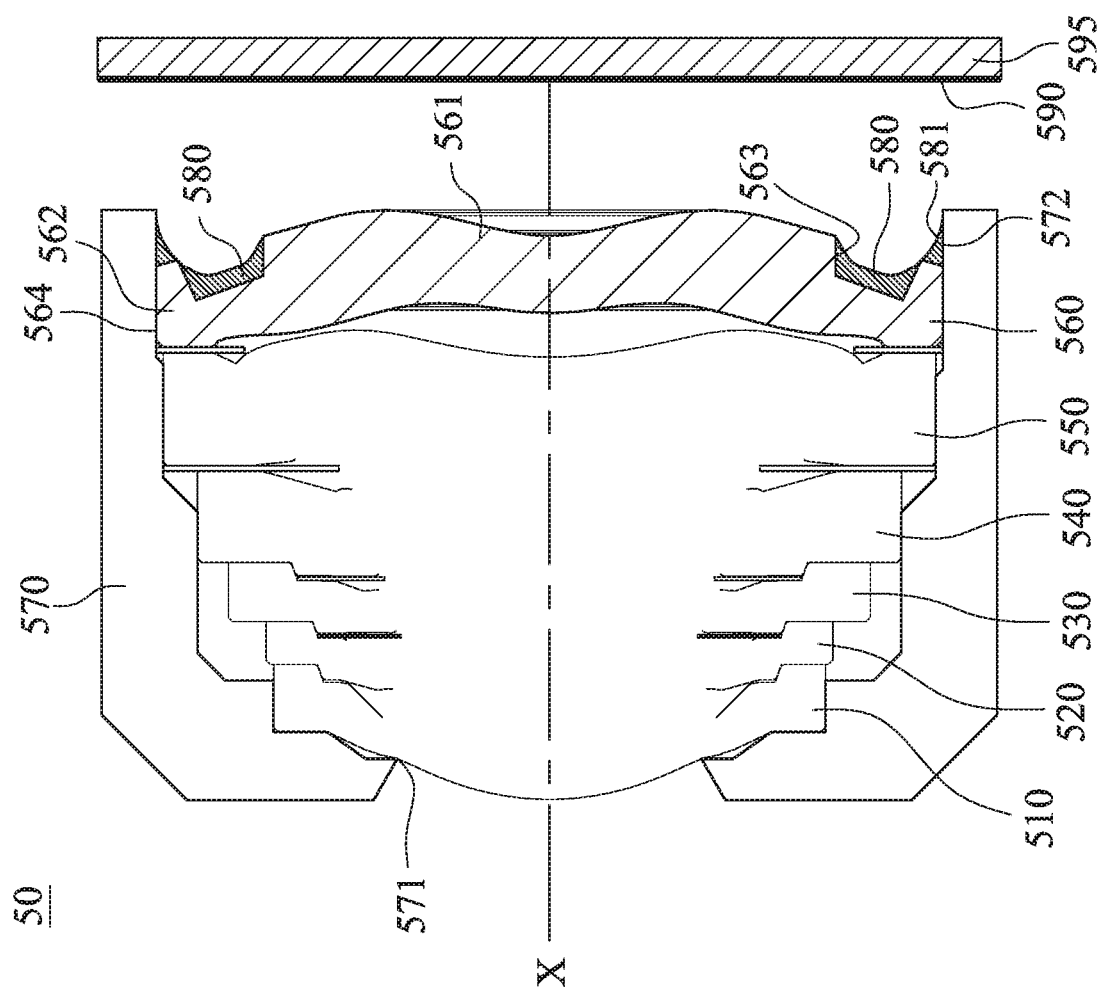
FIG. 5A is a schematic view of an electronic device according to the 5th example of the present disclosure.

FIG. 5A is a schematic view of an electronic device 50 according to the 5th example of the present disclosure. In FIG. 5A, the electronic device 50 (in detail, a camera unit of the electronic device 50) includes an imaging lens assembly module (its reference numeral is omitted) and an image sensor 595. The imaging lens assembly module has an optical axis X, and includes a plurality of lens elements, at least one plastic lens element 560, a carrier element 570, a light absorbing layer 580 and an image surface 590, wherein the carrier element 570 defines an inner space for disposing the lens elements and the plastic lens element 560, and the image surface 590 is located on an image side of the carrier element 570. The image sensor 595 is disposed on the image surface 590 of the imaging lens assembly module.

In detail, according to the 5th example, the imaging lens assembly module, in order from an object side to an image side, includes a first lens element 510, a second lens element 520, a third lens element 530, a fourth lens element 540, a fifth lens element 550 and the plastic lens element 560, wherein structures, surface shapes and so on of the first lens element 510, the second lens element 520, the third lens element 530, the fourth lens element 540 and the fifth lens element 550 can be disposed according to different imaging demand, and the structures, the surface shapes and so on are not important to the present disclosure, and will not disclose details thereof herein.

The plastic lens element 560, in order from a center to a peripheral region thereof, includes an optical effective portion 561 and a peripheral portion 562, wherein the optical axis X passes through the optical effective portion 561, and the peripheral portion 562 surrounds the optical effective portion 561. A side of at least one of an object side and an image side of the peripheral portion 562 includes a plurality of step structures 563, and the step structures 563 are interposed between the side of the at least one of the object side and the image side of the peripheral portion 562 and a same side of the optical effective portion 561. Via the step structures 563, a distance can be kept between the optical effective portion 561 and the adjacent peripheral portion 562 along a direction parallel to the optical axis X.

The carrier element 570 can be a plastic lens barrel or a single element which the plastic lens barrel integrally formed with a carrier via an injection molding. According to the 5th example, the carrier element 570 is the plastic lens barrel, but is not limited thereto.

The carrier element 570 includes a tip end minimal opening 571 and a plurality of annular inner walls 572, wherein the optical axis X passes through the tip end minimal opening 571. Diameters of the annular inner walls 572 vertical to the optical axis X are different, wherein at least one of the annular inner walls 572 faces towards the plastic lens element 560. Furthermore, the annular inner walls 572 facing towards the plastic lens element 560 can be regarded that the annular inner walls 572 are overlapped the plastic lens element 560 at a direction vertical to the optical axis X.

The light absorbing layer 580 is disposed on the peripheral portion 562 of the plastic lens element 560, the step structures 563 and the annular inner walls 572 facing towards the plastic lens element 560. Therefore, the plastic lens element 560 is connected to the optical effective portion 561 and the peripheral portion 562 via the step structures 563, and the liquid light absorbing layer 580 can sufficiently surround the optical effective portion 561.

In FIG. 5A, a portion of the light absorbing layer 580 is disposed on the annular inner walls 572 facing towards the plastic lens element 560 to form an annular concave arc 581. The light absorbing layer 580 is for retaining the plastic lens element 560 in the inner space of the carrier element 570. The annular concave arc 581 can be an open ring, and a cross section of the annular concave arc 581 is still a concave arc shape. Therefore, the liquid light absorbing layer 580 solidifies to form a light blocking cover with high blocking efficiency, and the light absorbing layer 580 after solidifying has the reliability of remaining the plastic lens element 560. Hence, the light absorbing layer 580 can be used as a retainer to proceed an assembling operation of the imaging lens assembly module. Simultaneously, a volume of the light absorbing layer 580 is smaller than a volume of a plastic retainer with a fixed shape, and the non-imaging light can be more effectively blocked via the light absorbing layer 580.

The tip end minimal opening 571 is disposed on an object side of the plastic lens element 560, and the light absorbing layer 580 is disposed on the image side of the plastic lens element 560 to surround the optical effective portion 561 of the image side of the plastic lens element 560. Moreover, a shape of the tip end minimal opening 571 is different from an opening shape of the light absorbing layer 580. Therefore, it can be regarded that the light blocking cover is disposed on an area of the imaging lens assembly module near the image surface 590. That is, excluding the necessary imaging light, the non-imaging light is captured via the light blocking cover as possible to avoid the further reflection of the non-imaging light. Hence, the better efficiency of capturing the non-imaging light can be achieved via a disposition position of the light absorbing layer 580 and a relative location of an entrance pupil of the imaging lens assembly module according to the 5th example.

In FIG. 5A, the object side of the plastic lens element 560 can further include an object-side receiving surface 564 for receiving a lens element adjacent the object side of the plastic lens element 560, and the object-side receiving surface 564 is a circular ring shape. According to the 5th example, the lens element adjacent the object side of the plastic lens element 560 is the fifth lens element 550. Therefore, a force on the plastic lens element 560 can be even, the risk of decreasing the precision level of forming the optical effective portion 561 can be decreased, and the circular symmetry, the precision level and the consistence of the optical effective portion 561 of the object-side surface can be better via the circular ring shape.

Figure 5B:
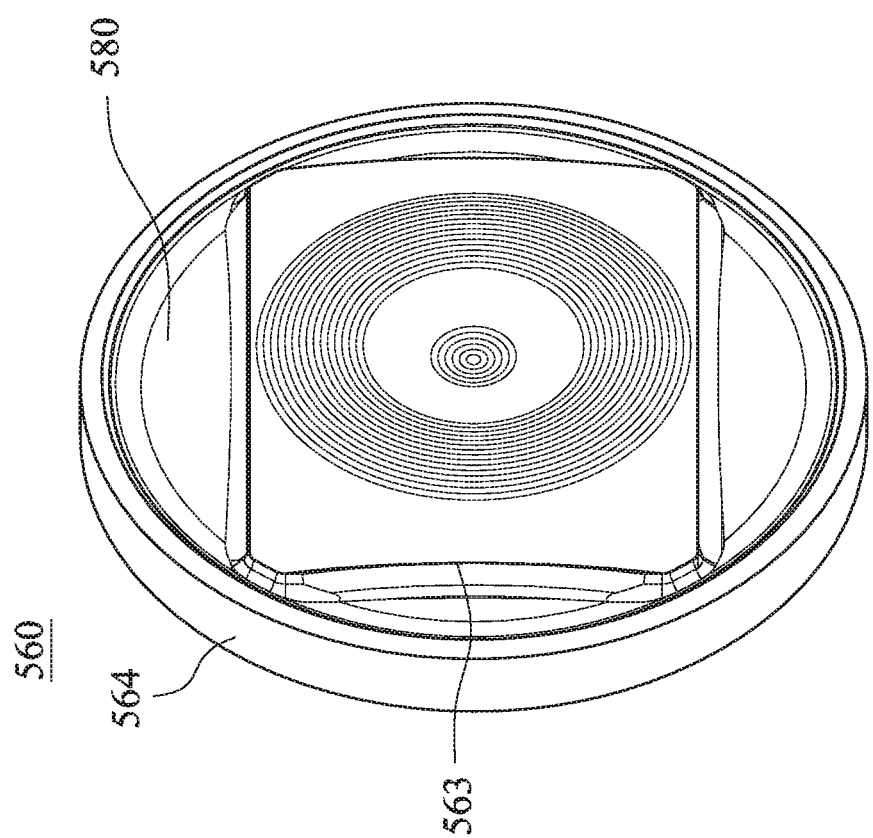
FIG. 5B is a schematic view of an image-side surface of the plastic lens element according to the 5th example in FIG. 5A.
Figure 5C:
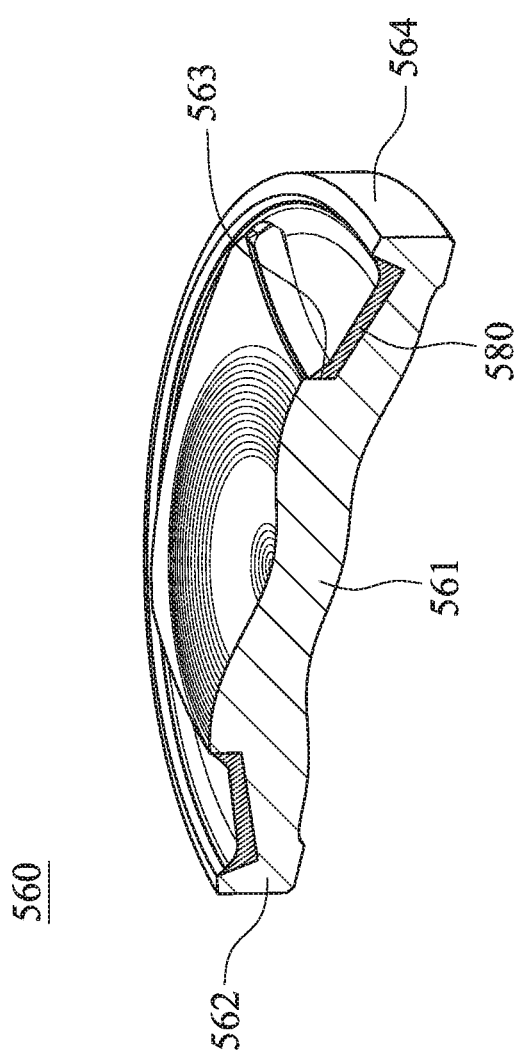
FIG. 5C is a cross-sectional schematic view of the plastic lens element according to the 5th example in FIG. 5B.

FIG. 5B is a schematic view of an image-side surface of the plastic lens element 560 according to the 5th example in FIG. 5A. FIG. 5C is a cross-sectional schematic view of the plastic lens element 560 according to the 5th example in FIG. 5B. In FIGS. 5B and 5C, the step structures 563 are for separating the optical effective portion 561 and the peripheral portion 562, an outer contour is formed on the side of the optical effective portion 561. According to the 5th example, the outer contour of the optical effective portion 561 of an image side is polygonal because the step structures 563 are interposed on the optical effective portion 561 of the image side. Therefore, the light absorbing layer 580 can be coated on an ideal position of the plastic lens element 560, and a blocking range of the light blocking cover can be increased. Moreover, a coating method of the present disclosure does not be limited by the coating method of prior art that must be along an annular track.

FIG. 5D is a top view of an image-side surface of the plastic lens element 560 according to the 5th example in FIG. 5A. In FIG. 5D, according to the 5th example, the outer contour of the optical effective portion 561 can be polygonal via the step structures 563, and the liquid light absorbing layer 580 solidifies can sufficiently surround the optical effective portion 561 to be coated on the step structures 563 and the peripheral portion 562. Hence, a polygonal inner opening corresponding to the outer contour of the optical effective portion 561 is formed. Furthermore, according to the 5th example, an opening shape of the light absorbing layer 580 can be a polygon, that is, the light absorbing layer 580 includes a plurality of lengths. In detail, the opening shape of the light absorbing layer 580 is octagon, that is, the light absorbing layer 580 includes eight lengths. It can be regarded as the engineering consideration that is used to improve the glare from the light absorbing layer 580. Moreover, at least two of the eight lengths can be different, and even at least three of the eight lengths can be different. Therefore, the light-blocking absorbing layer of a larger blocking range can be manufactured, a number of the lengths can be ideally controlled, and the possibility of mass production can be increased. In detail, according to the 5th example, three of the eight lengths of the opening of the light absorbing layer 580 are different, which are a length L1, a length L2 and a length L3, wherein the length L1 is 0.21 mm, and a number of the lengths L1 is four; the length L2 is 3.71 mm, and a number of the lengths L2 is two; the length L3 is 2.73 mm, and a number of the lengths L3 is two.

Figure 5F:
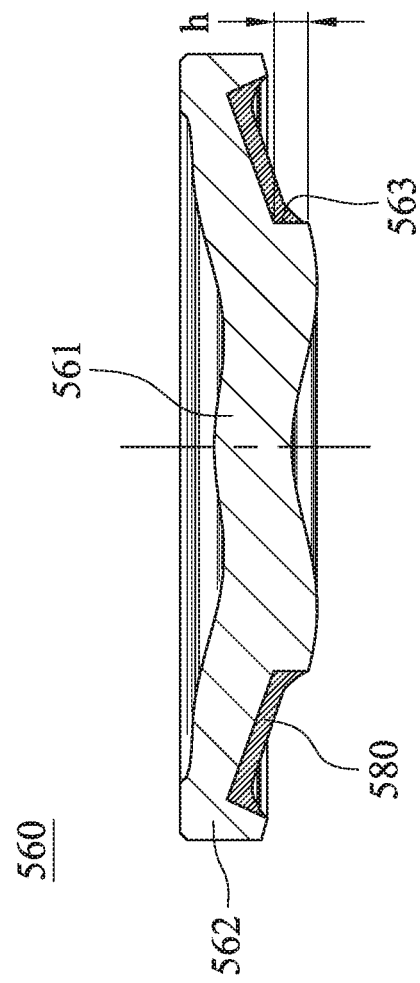
FIG. 5F is a cross-sectional schematic view of a D-D' direction of the plastic lens element according to the 5th example in FIG. 5D.
Figure 5E:
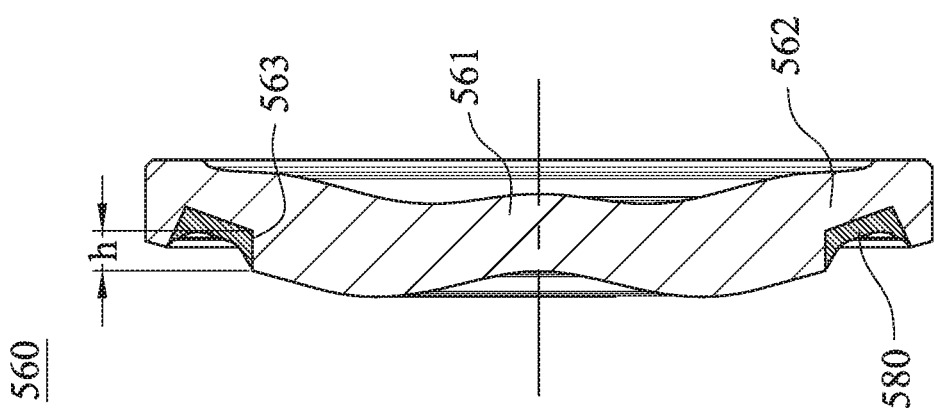
FIG. 5E is a cross-sectional schematic view of a C-C' direction of the plastic lens element according to the 5th example in FIG. 5D.

FIG. 5E is a cross-sectional schematic view of a C-C' direction of the plastic lens element 560 according to the 5th example in FIG. 5D. FIG. 5F is a cross-sectional schematic view of a D-D' direction of the plastic lens element 560 according to the 5th example in FIG. 5D. In FIGS. 5E and 5F, the step structures 563 can be an arc structure. Therefore, the step structures 563 can be flexibly cooperated with a structure of the optical effective portion 561, and a geometric shape of a portion of the optical effective portion 561 close the step structures 563 can be avoid being excessively different to decrease the risk of molding failure.

In FIGS. 5D and 5F, according to the 5th example, when a height difference between each of the step structures 563 parallel to a direction of the optical axis X is h, a value of h at the C-C' direction is 0.29 mm, a value of h at the D-D' direction is 0.25 mm, and the step structures 563 can have uneven heights. Therefore, it is favorable for fitting an outer peripheral portion of the optical effective portion 561 to decrease the failure ratio of the injection molding of the plastic lens element 560.

6th Example

Figure 6A:
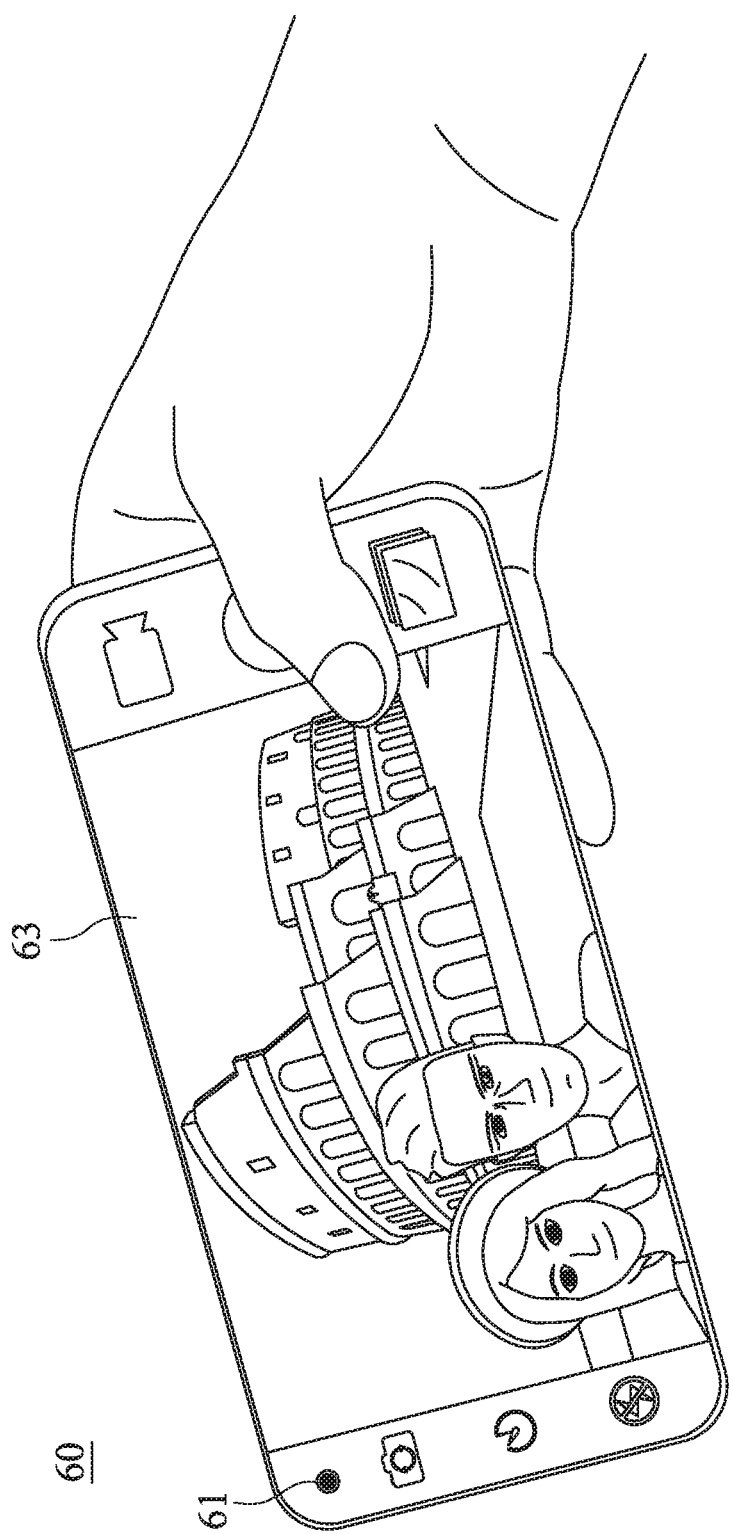
FIG. 6A is a schematic view of an electronic device according to the 6th example of the present disclosure.
Figure 6B:
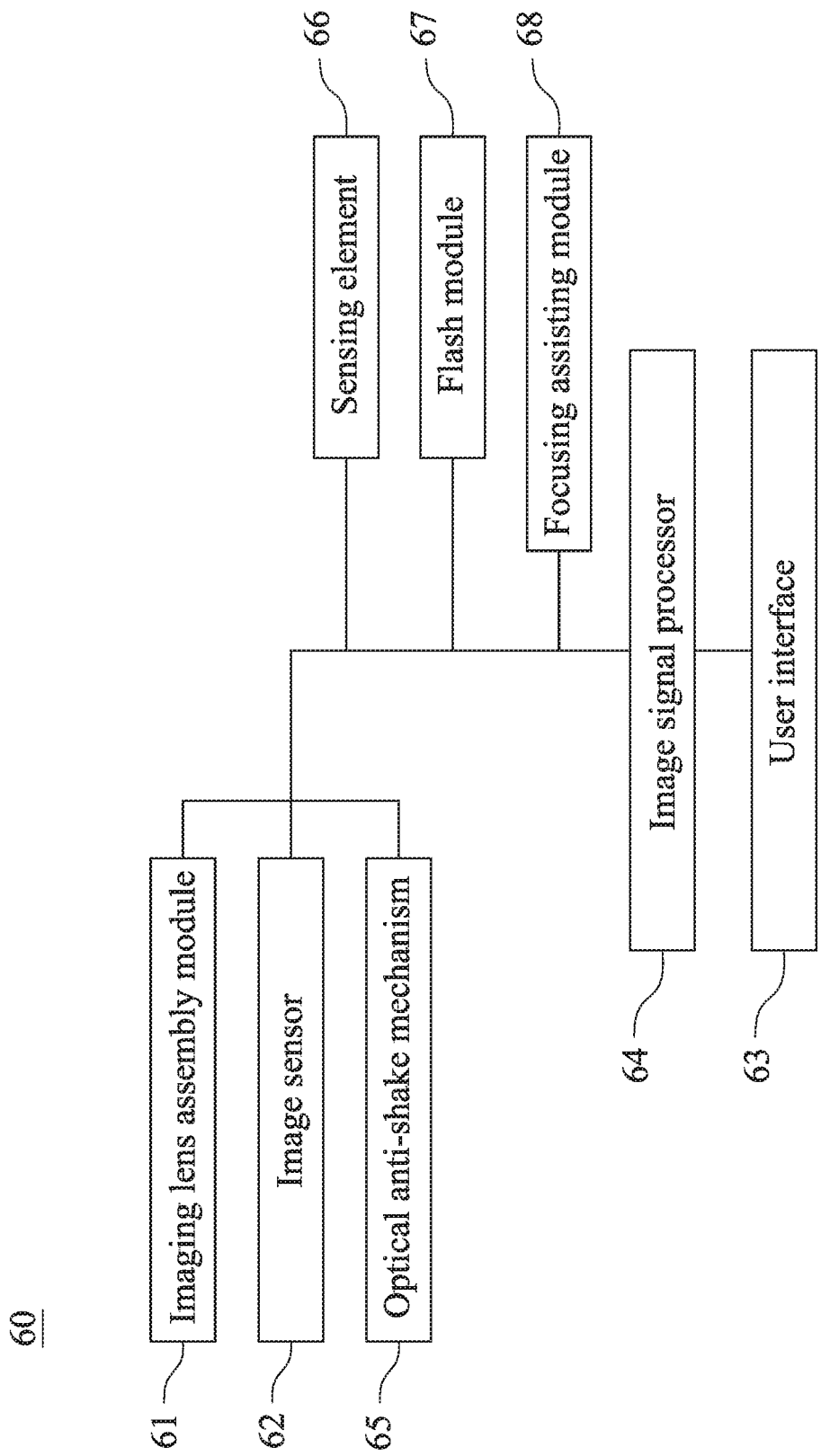
FIG. 6B is a block diagram of the electronic device according to the 6th example in FIG. 6A.

FIG. 6A is a schematic view of an electronic device 60 according to the 6th example of the present disclosure. FIG. 6B is a block diagram of the electronic device 60 according to the 6th example in FIG. 6A. In FIGS. 6A and 6B, the electronic device 60 is a smart phone, and includes an imaging lens assembly module 61, a user interface 63 and an image sensor 62. The imaging lens assembly module 61 according to the 6th example is disposed on an area of side of the user interface 63, the image sensor 62 is disposed on the image surface (not shown) of the imaging lens assembly module 61, wherein the user interface 63 can be a touch screen or a display screen, but is not limited thereto. The imaging lens assembly module 61 can be one of the imaging lens assembly modules according to the aforementioned 1st example to the 5th example, and the imaging lens assembly module 61 includes a carrier element (not shown), a plurality of lens elements (not shown) and at least one plastic lens element (not shown), wherein the lens elements and the plastic lens element are disposed in the carrier element, but is not limited thereto.

Moreover, users enter a shooting mode via the user interface 63 of the electronic device 60. At this moment, the imaging light is gathered on the image sensor 62 via the imaging lens assembly module 61, and an electronic signal about an image is output to an image signal processor (ISP) 64.

To meet a specification of a camera of the electronic device 60, the electronic device 60 can further include an optical anti-shake mechanism 65, which can be an optical image stabilization (01S). Furthermore, the electronic device 60 can further include at least one auxiliary optical element (its reference numeral is omitted) and at least one sensing element 66. According to the 6th example, the auxiliary optical element is a flash module 67 and a focusing assisting module 68. The flash module 67 can be for compensating a color temperature, and the focusing assisting module 68 can be an infrared distance measurement component, a laser focus module, etc. The sensing element 66 can have functions for sensing physical momentum and kinetic energy, such as an accelerator, a gyroscope, a Hall Effect Element, to sense shaking or jitters applied by hands of the user or external environments. Accordingly, the imaging lens assembly module 61 of the electronic device 60 equipped with an auto-focusing mechanism and the optical anti-shake mechanism 65 can be enhanced to achieve the superior image quality. Furthermore, the electronic device 60 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 60 can further include, but not be limited to, a display, a control unit, a storage unit, a random access memory (RAM), a read-only memory (ROM), or the combination thereof.

Figure 6C:
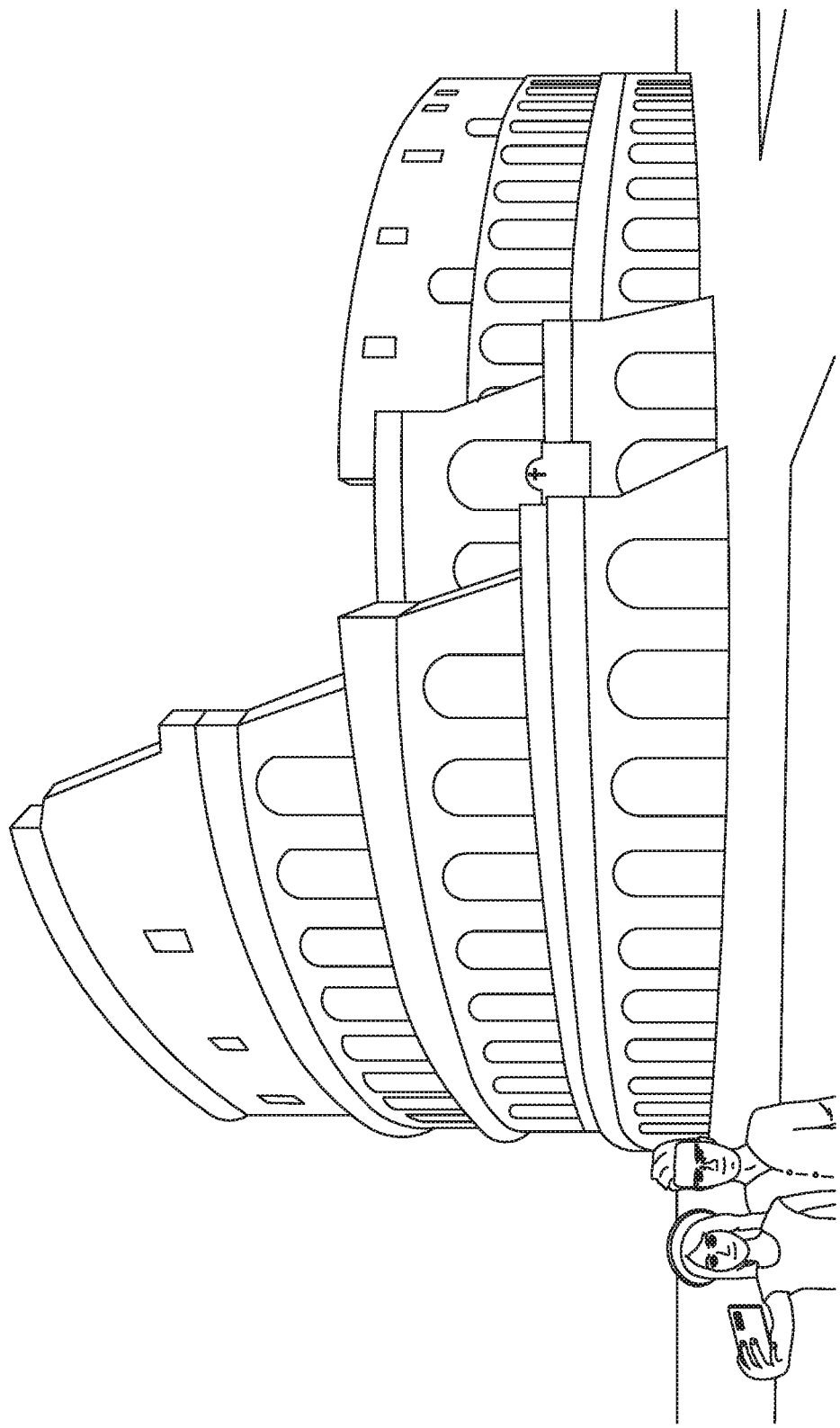
FIG. 6C is a schematic view of selfie scene according to the 6th example in FIG. 6A.
Figure 6D:
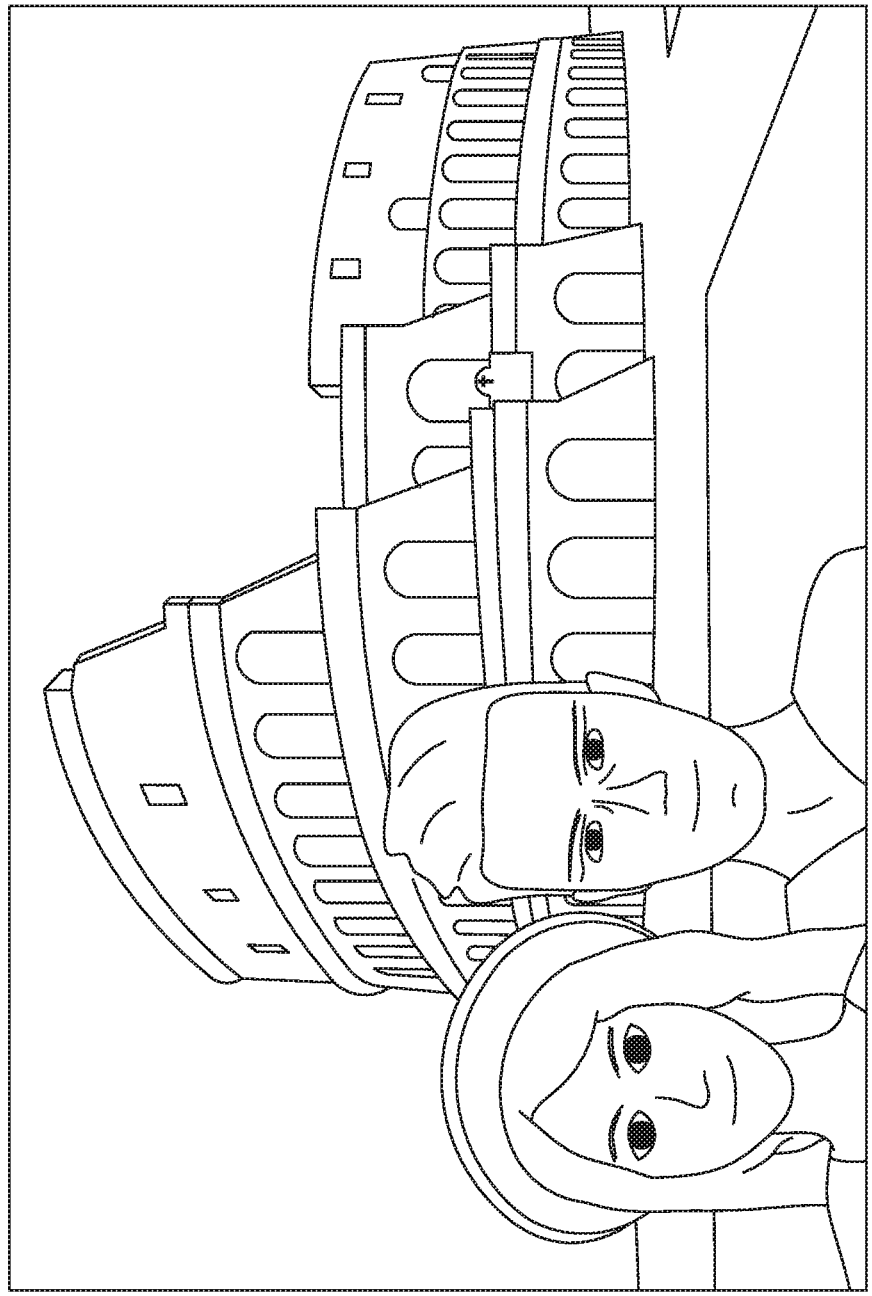
FIG. 6D is a schematic view of a captured image according to the 6th example in FIG. 6A.

FIG. 6C is a schematic view of selfie scene according to the 6th example in FIG. 6A. FIG. 6D is a schematic view of a captured image according to the 6th example in FIG. 6A. In FIGS. 6A to 6D, the imaging lens assembly module 61 and the user interface 63 face towards the users. When proceeding selfie or live streaming, the users can watch a captured image and operate an interface at the same time, and the capture image as FIG. 6D can be obtained after shooting. Therefore, better shooting experience can be provided via the imaging lens assembly module 61 of the present disclosure.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, which has an optical axis, comprising:
   at least one plastic lens element, in order from a center to a peripheral region thereof, comprising:
      an optical effective portion, the optical axis passing through the optical effective portion; and
      a peripheral portion surrounding the optical effective portion, and a side of at least one of an object side and an image side of the peripheral portion comprising:
      a plurality of step structures interposed between the side of the at least one of the object side and the image side of the peripheral portion and a same side of the optical effective portion;
   a carrier element defining an inner space for disposing the at least one plastic lens element, and comprising:
      a tip end minimal opening, wherein the optical axis passes through the tip end minimal opening; and
      a plurality of annular inner walls, diameters of the annular inner walls vertical to the optical axis being different, wherein at least one of the annular inner walls faces towards the at least one plastic lens element; and
   a light absorbing layer disposed on the peripheral portion of the at least one plastic lens element, the step structures and the at least one of the annular inner walls facing towards the at least one plastic lens element;
   wherein a portion of the light absorbing layer is disposed on the at least one of the annular inner walls facing towards the at least one plastic lens element to form an annular concave arc;
   wherein the light absorbing layer is for fixing all of lens elements comprising the at least one plastic lens element in the inner space of the carrier element;
   wherein each of the step structures is an arc structure, each of the step structures comprises a first arc structure and a second arc structure, the first arc structure is located on the peripheral portion, and the second arc structure is located on an outer contour of the optical effective portion.

2. The imaging lens assembly module of claim 1, wherein a height difference between each of the step structures parallel to a direction of the optical axis is h, and the following condition is satisfied:

0.015 mm<h<0.5 mm.

3. The imaging lens assembly module of claim 2, wherein the step structures have uneven heights.

4. The imaging lens assembly module of claim 3, wherein the height difference between each of the step structures parallel to the direction of the optical axis is h, and the following condition is satisfied:

0.02 mm<h<0.4 mm.

5. The imaging lens assembly module of claim 1, wherein the step structures are for separating the optical effective portion and the peripheral portion, an outer contour is formed on the side of the optical effective portion, and the outer contour is different from an outer contour formed on the other side of the optical effective portion.

6. The imaging lens assembly module of claim 5, wherein an object side of the at least one plastic lens element further comprises an object-side receiving surface for receiving a lens element adjacent the object side of the at least one plastic lens element, and the object-side receiving surface is a circular ring shape.

7. The imaging lens assembly module of claim 1, wherein both of a center to a peripheral region of the first arc structure and a center to a peripheral region of the second arc structure bend from an image side of the imaging lens assembly module to an object side of the imaging lens assembly module.

8. An electronic device, comprising:
   the imaging lens assembly module of claim 1; and
   an image sensor disposed on an image surface of the imaging lens assembly module.

9. An imaging lens assembly module, which has an optical axis, comprising:
   at least one plastic lens element, in order from a center to a peripheral region thereof, comprising:
      an optical effective portion, the optical axis passing through the optical effective portion; and
      a peripheral portion surrounding the optical effective portion, and a side of at least one of an object side and an image side of the peripheral portion comprising:
      a plurality of step structures interposed between the side of the at least one of the object side and the image side of the peripheral portion and a same side of the optical effective portion;
   a carrier element defining an inner space for disposing the at least one plastic lens element, and comprising:
      a tip end minimal opening, wherein the optical axis passes through the tip end minimal opening; and
      a plurality of annular inner walls, diameters of the annular inner walls vertical to the optical axis being different, wherein at least one of the annular inner walls faces towards the at least one plastic lens element; and
   a light absorbing layer disposed on the peripheral portion of the at least one plastic lens element and the at least one of the annular inner walls facing towards the at least one plastic lens element;
   wherein a portion of the light absorbing layer is disposed on the at least one annular inner wall facing towards the at least one plastic lens element to form an annular concave arc;
   wherein the light absorbing layer is for fixing all of lens elements comprising the at least one plastic lens element in the inner space of the carrier element;
   wherein the tip end minimal opening is disposed on an object side of the at least one plastic lens element, and the light absorbing layer is disposed on an image side of the at least one plastic lens element to surround the optical effective portion of the image side of the at least one plastic lens element;
   wherein a shape of the tip end minimal opening is different from an opening shape of the light absorbing layer;
   wherein each of the step structures is an arc structure, each of the step structures comprises a first arc structure and a second arc structure, the first arc structure is located on the peripheral portion, and the second arc structure is located on an outer contour of the optical effective portion.

10. The imaging lens assembly module of claim 9, wherein the opening shape of the light absorbing layer is a polygon.

11. The imaging lens assembly module of claim 10, wherein the polygon comprises a plurality of lengths, and at least two of the lengths are different.

12. The imaging lens assembly module of claim 11, wherein a number of sides of the polygon is N, and the following condition is satisfied:

$3<N<33$.

13. The imaging lens assembly module of claim 12, wherein at least three of the lengths are different.

14. The imaging lens assembly module of claim 13, wherein the number of the sides of the polygon is N, and the following condition is satisfied:

$3<N<9$.

15. The imaging lens assembly module of claim 13, wherein the number of the sides of the polygon is N, and the following condition is satisfied:

$11<N<26$.

16. The imaging lens assembly module of claim 9, wherein the light absorbing layer is disposed on the step structures, and the light absorbing layer on the step structures has an uneven thickness.

17. An electronic device, comprising:
   the imaging lens assembly module of claim 9; and
   an image sensor disposed on an image surface of the imaging lens assembly module;
   wherein a photosensitive area of the image sensor is a rectangle, the opening shape of the light absorbing layer of the imaging lens assembly module is a polygon, and a long side of the rectangle is corresponding to a longest side of the polygon.

\* \* \* \* \*